US010416942B2

(12) United States Patent
Hashimoto

(10) Patent No.: US 10,416,942 B2
(45) Date of Patent: Sep. 17, 2019

(54) IMAGE PROCESSING APPARATUS, INFORMATION PROCESSING SYSTEM, INFORMATION PROCESSING METHOD, AND RECORDING MEDIUM

(71) Applicant: Takahiro Hashimoto, Kanagawa (JP)

(72) Inventor: Takahiro Hashimoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 57 days.

(21) Appl. No.: 15/712,360

(22) Filed: Sep. 22, 2017

(65) Prior Publication Data

US 2018/0088883 A1 Mar. 29, 2018

(30) Foreign Application Priority Data

Sep. 29, 2016 (JP) ................................ 2016-191505
Jun. 30, 2017 (JP) ................................ 2017-129929

(51) Int. Cl.
*G06F 3/12* (2006.01)
*B41J 3/46* (2006.01)

(52) U.S. Cl.
CPC .............. *G06F 3/1278* (2013.01); *B41J 3/46* (2013.01); *G06F 3/1224* (2013.01); *G06F 3/1229* (2013.01)

(58) Field of Classification Search
CPC .... G06F 3/1288; G06F 3/1204; G06F 3/1212; G06F 3/1231; G06F 3/126; G06F 3/1291; G06F 17/30575; G06F 21/32; G06F 21/35; G06F 21/45; G06F 21/608; G06F 21/71; G06F 3/002; G06F 3/0321; G06F 3/03545; G06F 3/1213; G06F 3/1224; G06F 3/1229; G06F 3/1244; G06F 3/1275; G06F 3/1278; G06F 3/1293; H04N 2201/0094;
(Continued)

(56) References Cited

U.S. PATENT DOCUMENTS 8,988,722 B2 * 3/2015 Hashimoto ........ H04N 1/00403
358/1.15
9,146,697 B2 * 9/2015 Hashimoto ........... G06F 3/1232
(Continued)

FOREIGN PATENT DOCUMENTS

CN 1648917 A 8/2005
EP 3070619 A1 9/2016
JP 2014-106735 6/2014

OTHER PUBLICATIONS

Office Action for Chinese Patent Application No. 201710909200.2 dated Jan. 31, 2019.

*Primary Examiner* — Negussie Worku
(74) *Attorney, Agent, or Firm* — Harness, Dickey & Pierce, P.L.C.

(57) ABSTRACT

An image processing apparatus includes: an image processing engine to perform image processing; a memory to store setting information used in the image processing; a control panel to accept an operation instruction for operating the image processing engine and an input instruction for editing the setting information; and a Web server, functioning as a Web API service, to accept a request of the instruction from the control panel via one or more Web APIs. The control panel receives a response to the instruction for editing from the Web API service, and displays the received response as a result of the editing of the setting information.

16 Claims, 18 Drawing Sheets

(58) Field of Classification Search
CPC ........... H04N 1/00347; H04N 1/00973; H04N 2201/0039; H04N 1/00204; H04N 1/00217; H04N 1/00344; H04N 2201/0072; H04N 1/00127; H04N 1/0097; H04N 2201/0093; H04N 2201/0098; H04W 4/14; H04W 4/60
USPC ............ 358/1.15, 1.13, 402, 1.16, 403, 407; 379/201.11; 709/206
See application file for complete search history.

(56) References Cited

U.S. PATENT DOCUMENTS

| | | | |
|---|---|---|---|
| 9,152,365 B2* | 10/2015 | Hikichi | G06F 3/1213 |
| 9,292,232 B2* | 3/2016 | Toriumi | G06F 3/1204 |
| 9,710,432 B2* | 7/2017 | Hashimoto | G06F 17/212 |
| 9,754,833 B2* | 9/2017 | Hashimoto | H01L 21/78 |
| 2005/0188038 A1* | 8/2005 | Yabe | G06Q 10/107 709/206 |
| 2012/0218596 A1* | 8/2012 | Hashimoto | G06F 3/1207 358/1.15 |
| 2014/0019859 A1 | 1/2014 | Hashimoto | |
| 2014/0198342 A1* | 7/2014 | Nakabayashi | H04N 1/00344 358/1.15 |
| 2014/0253939 A1 | 9/2014 | Hashimoto | |
| 2014/0333948 A1 | 11/2014 | Hashimoto | |
| 2016/0085768 A1 | 3/2016 | Hashimoto | |
| 2016/0216975 A1* | 7/2016 | Hashimoto | G06F 9/4818 |
| 2016/0277241 A1* | 9/2016 | Nakamori | H04L 41/0813 |
| 2018/0068110 A1* | 3/2018 | Watanabe | G06F 21/608 |

* cited by examiner

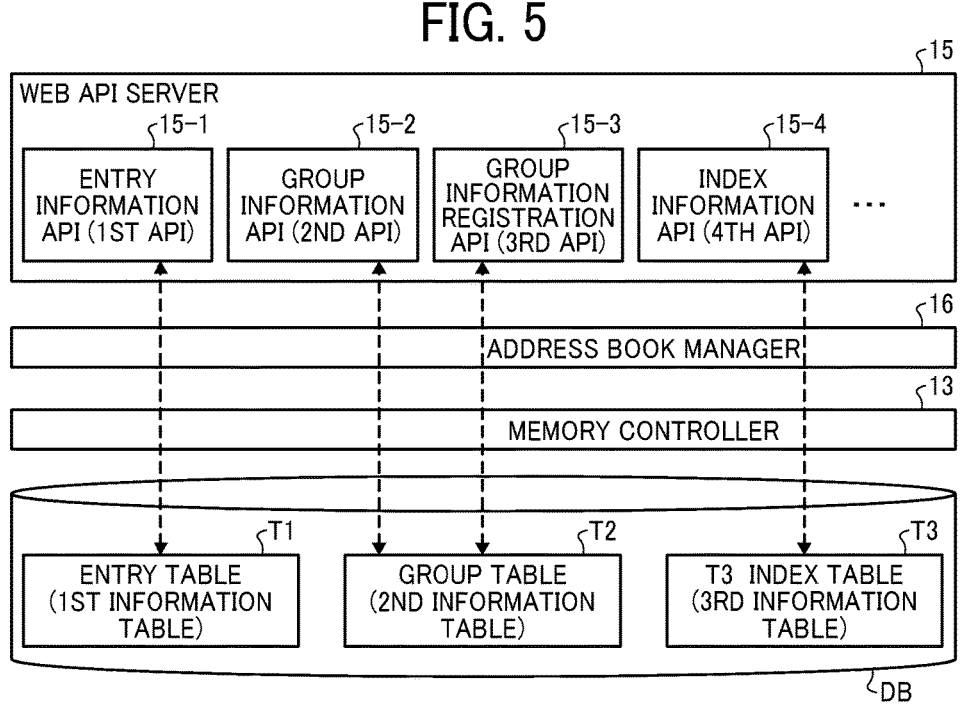

| ENTRY ID (t10) | ENTRY TYPE (t110) | DISPLAYED NAME (t111) | EMAIL ADDRESS (t112) | FACSIMILE NUMBER (t113) | TRANSMISSION DESTINATION FOLDER (t114) | ... |
|---|---|---|---|---|---|---|
| a1 | Address | SUZUKI | a.suzuki@hoge.com | 0120123123 | — | ... |
| a2 | Address | KATOH | b.katoh@hoge.com | 0120123123 | — | ... |
| ... | ... | ... | ... | ... | ... | ... |
| b1 | User | SATOH | Satoh.t@abc.com | 0120123123 | ¥192.168.1.10¥satoh | ... |
| ... | ... | ... | ... | ... | ... | ... |
| c1 | Group | ADMINISTRATION DEPT. | — | — | — | ... |
| c2 | Group | DEVELOPMENT DEPT. | — | — | — | ... |
| ... | ... | ... | ... | ... | ... | ... |

| t20 | t21 | t22 | t23 |
|---|---|---|---|
| GROUP ID | DISPLAYED NAME | NUMBER OF ENTRIES | ENTRY ID ARRAY |
| c1 | ADMINISTRATION DEPT. | 2 | a1, a2 |
| c2 | DEVELOPMENT DEPT. | 1 | b1 |
| ⋮ | ⋮ | ⋮ | ⋮ |

| t30 | t31 | t32 | t33 |
|---|---|---|---|
| INDEX ID | DISPLAYED NAME | NUMBER OF ENTRIES | ENTRY ID ARRAY |
| B1 | ALL | 16 | a1, a2,⋯c1,c2⋯ |
| B2 | KA-COLUMN | 1 | a2 |
| B3 | SA-COLUMN | 2 | a1, b1 |
| ⋮ | ⋮ | ⋮ | ⋮ |

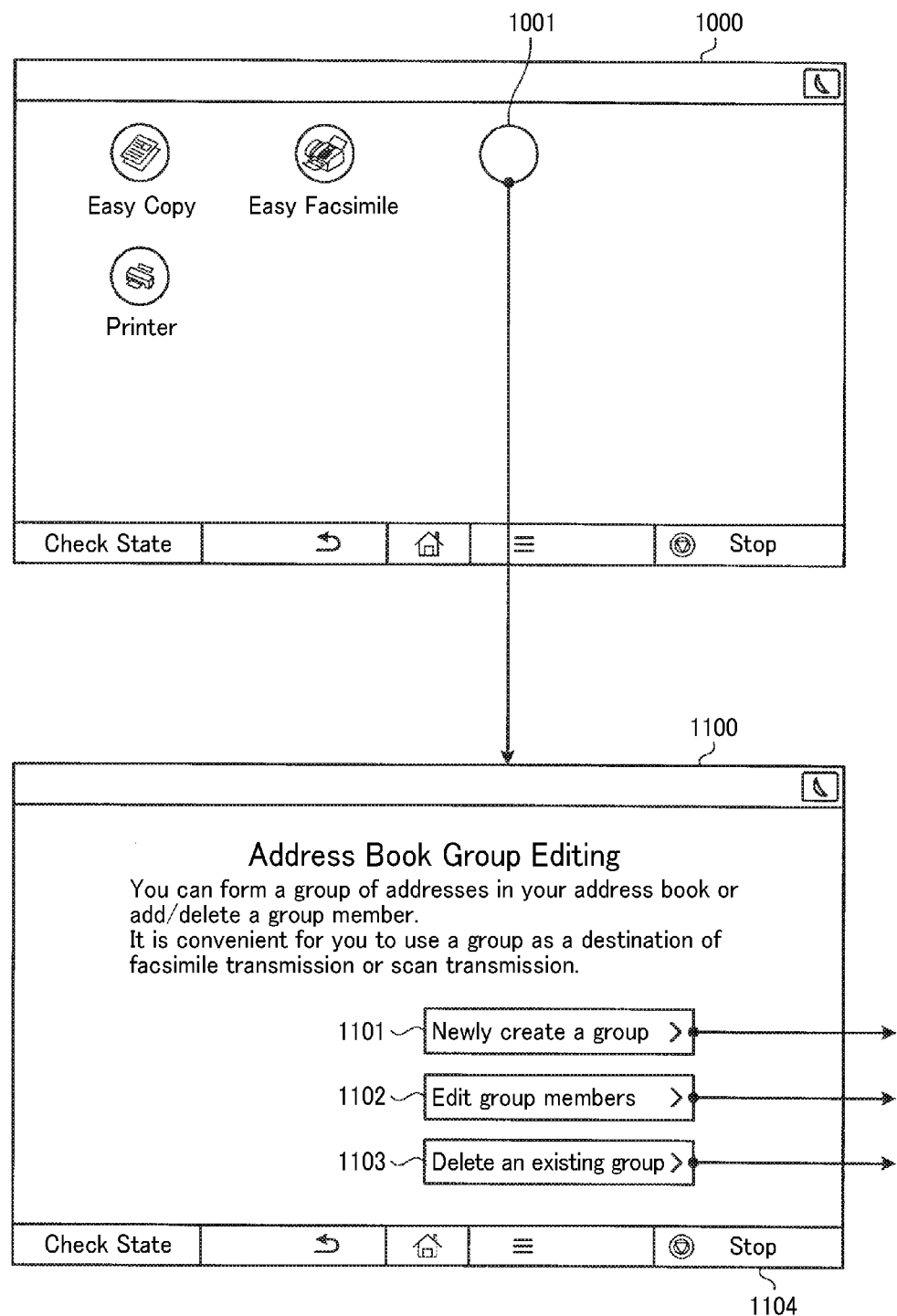

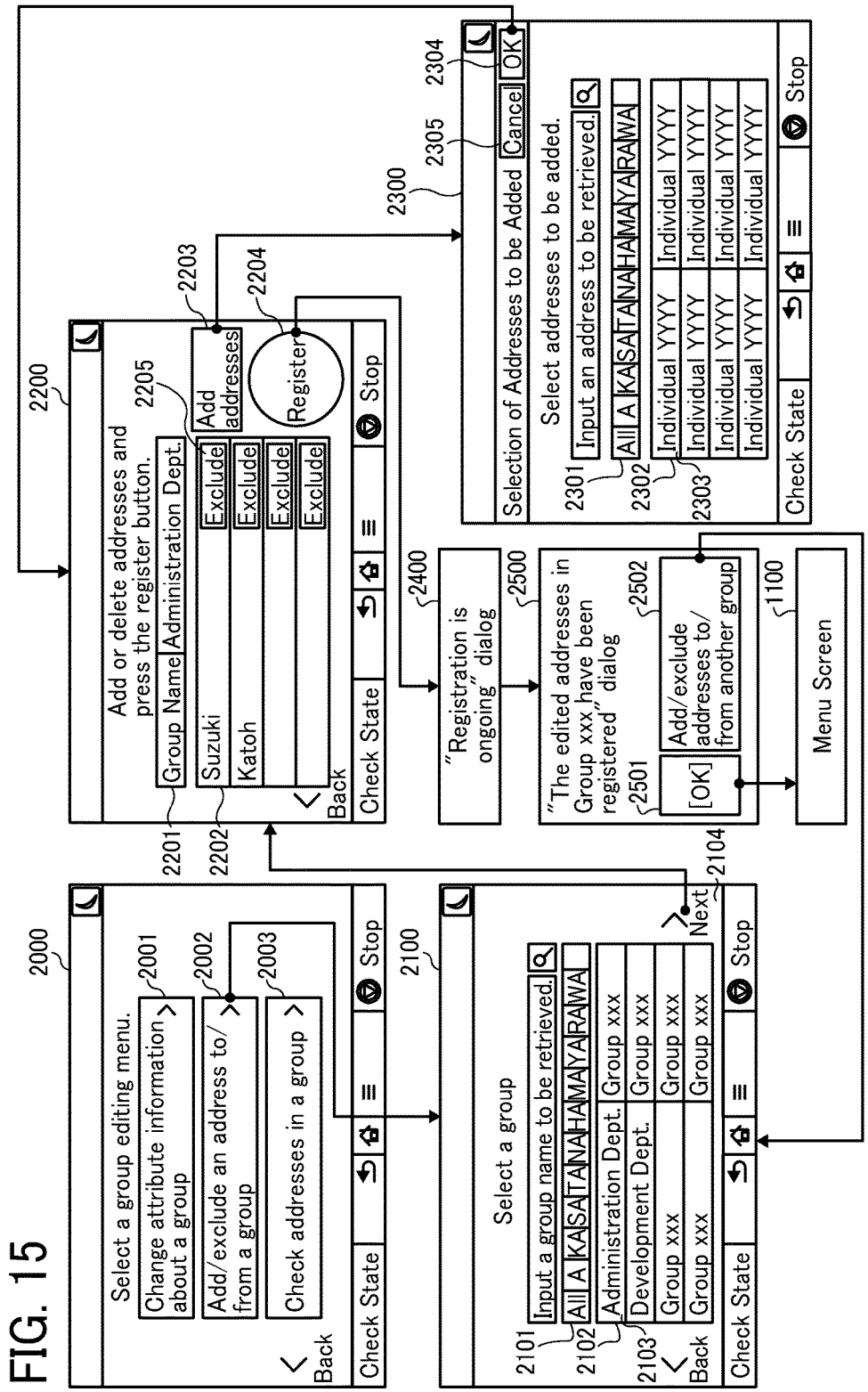

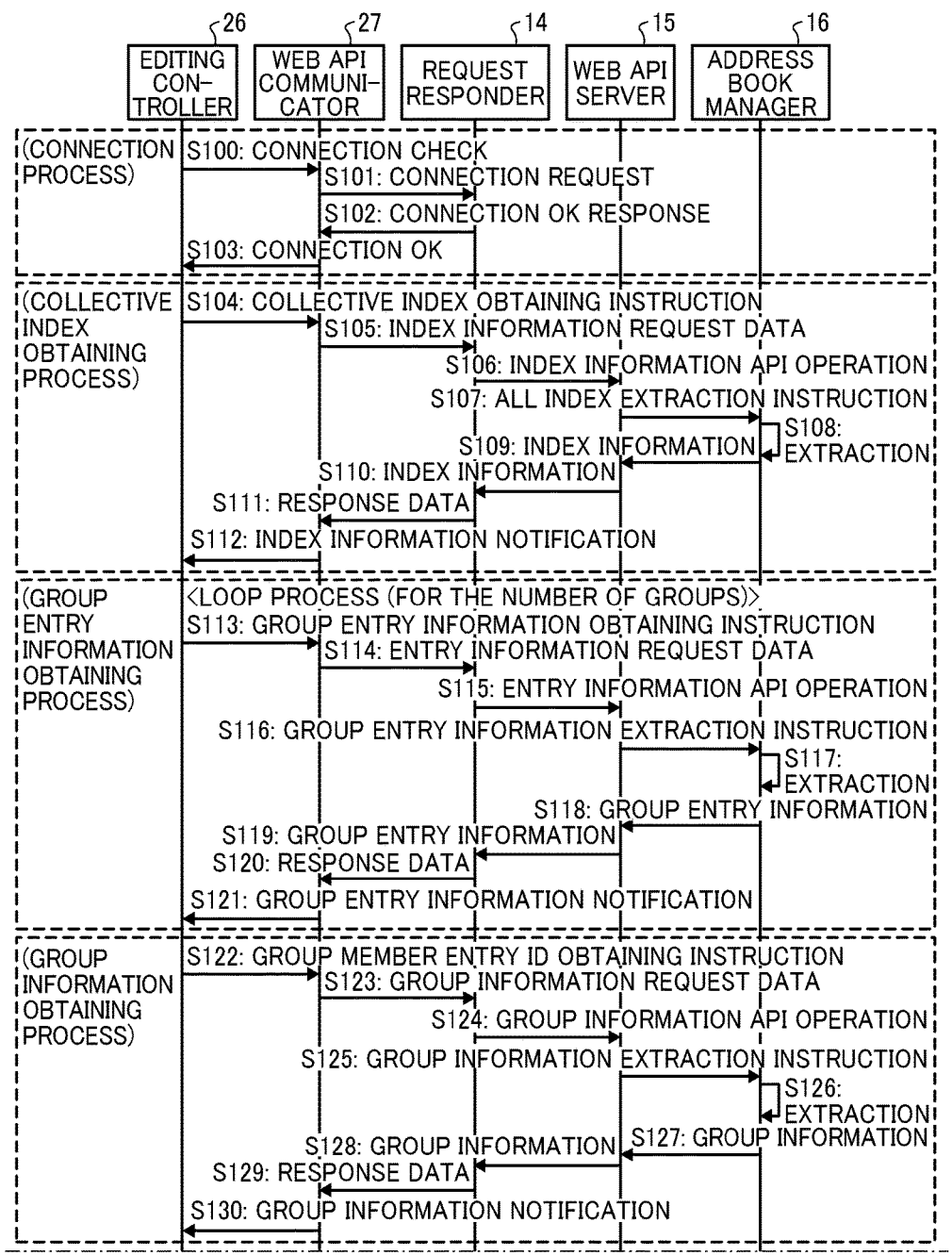

IMAGE PROCESSING APPARATUS, INFORMATION PROCESSING SYSTEM, INFORMATION PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2016-191505, filed on Sep. 29, 2016 and Japanese Patent Application No. 2017-129929, filed on Jun. 30, 2017, in the Japan Patent Office, the entire disclosure of which is hereby incorporated by reference herein.

BACKGROUND

Technical Field

The present invention relates to an image processing apparatus, an information processing system, an information processing method, and a recording medium.

Description of the Related Art

The recent image processing apparatus, such as a multi-function peripheral (MFP), connected to an intra-company network, often stores management information in a main unit to be shared among a plurality of users. The management information includes, for example, address book information in which data transmission destinations, namely, address information of individuals and groups, are registered as setting information.

For example, the address information stored in the main unit of the image processing apparatus may be transferred to an external information processing apparatus. In one example, the information processing apparatus obtains a part or entire address information from the image processing apparatus and uses the address information in, for example, facsimile transmission. In a case where the address information stored in the main unit of the image processing apparatus is changed, the information processing apparatus obtains the changed address information, and edits the address information stored in the information processing apparatus using the newly obtained address information.

That is, it has not been possible to edit information in the main unit of the image processing apparatus by an operation from the information processing apparatus that is independent of the image processing apparatus.

SUMMARY

Example embodiments of the present invention include an image processing apparatus including: an image processing engine to perform image processing; a memory to store setting information used in the image processing; a control panel to accept an operation instruction for operating the image processing engine and an input instruction for editing the setting information; and a Web server, functioning as a Web API service, to accept a request of the instruction from the control panel via one or more Web APIs. The control panel receives a response to the instruction for editing from the Web API service, and displays the received response as a result of the editing of the setting information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 5 is a diagram for describing the functions of the APIs of the Web API server;

FIGS. 6A to 6D are diagrams illustrating exemplary structures of request data of various types, the request data being transmitted to the main unit by a Web API communicator;

FIG. 8 is a diagram illustrating an exemplary data structure of an entry table;

FIG. 9 is a diagram illustrating an exemplary data structure of a group table;

FIG. 10 is a diagram illustrating an exemplary data structure of an index table;

FIG. 14 is a diagram illustrating an exemplary screen flow on the control panel;

FIG. 15 is a diagram illustrating the exemplary screen flow (continued) on the control panel;

FIG. 16A, FIG. 16B, and FIG. 17 are sequence charts illustrating an exemplary sequence of a communication process between the control panel and the main unit;

Figure 1:
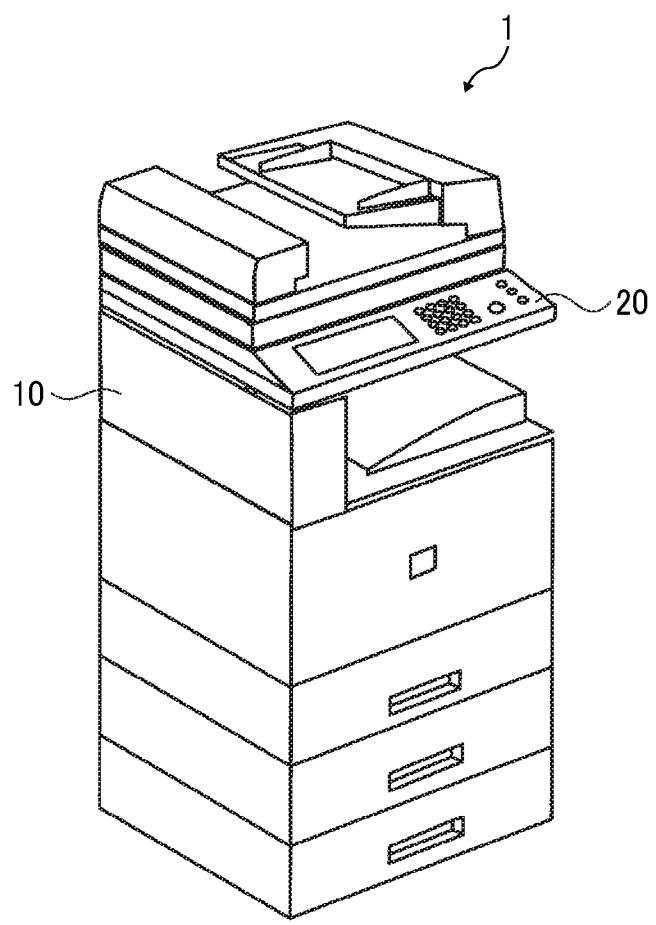
FIG. 1 is a diagram illustrating an external view of an MFP that is illustrated as an example of an image processing apparatus according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an image processing apparatus, an information processing system, a method, and a program according to embodiments of the present invention will be described in detail with reference to the attached drawings.

First Embodiment

FIG. 1 is a diagram illustrating an external view of an MFP that is illustrated as an example of an image processing apparatus according to this embodiment. The MFP is an apparatus that has two or more different functions among a plurality of functions including a copy function, a scanner function, a printer function, and a facsimile function. The image processing apparatus is not limited to an apparatus like the MFP having two or more different functions and may be a printer having a single function. FIG. 1 illustrates an MFP 1, which has, for example, a copy function, a scanner function, and a printer function.

The MFP 1 includes a main unit 10 and a control panel 20. The main unit 10 includes an image processing unit that performs copying, scanning, and so on and an image forming unit that forms images by ejecting ink.

The control panel 20 is an example of a control panel according to this embodiment. The control panel 20 includes a user interface (UI) for a user to operate an image processing engine of the main unit 10 for image processing and image formation and to operate setting information in the main unit 10 (in this example, setting information stored on the main unit 10). The main unit 10 and the control panel 20 are connected to each other via wired or wireless communication and exchange operation signals, data, and so on via a communication channel 30 (see FIG. 2).

In this embodiment, the control panel 20 obtains the setting information from the main unit 10 and edits the obtained setting information as appropriate. The setting information may include other retained information (management information) managed by the main unit 10. The main unit 10 outputs, when accepting an input instruction for obtaining the setting information from the control panel 20, the setting information to the control panel 20. The main unit 10 edits, when accepting an input instruction for editing the setting information from the control panel 20, the setting information and outputs the result of editing to the control panel 20. The control panel 20 operates the image processing engine by, for example, transmitting an order, such as an operation instruction, to the main unit 10 and controls the image processing unit, the image forming unit, and so on.

The setting information in the main unit 10 is obtained and edited (registered) by the control panel 20 via APIs provided in the main unit 10 in a certain form. An example of the form in a case of using Web APIs as the APIs is described. The APIs are Web APIs (mainly, Representational State Transfer (REST) Web APIs) unless otherwise specifically indicated. The REST Web APIs transmit a request (also called "request data") that uses a method, such as GET (obtaining), POST (registration), PUT (update), and DELETE (deletion), and a uniform resource identifier (URI) for identifying a resource (in this embodiment, entry information, group information, or index information) to a Web (World Wide Web) server, and receive a response (also called "response data") from the Web server in the form of JavaScript (registered trademark) Object Notation (JSON), Extensible Markup Language (XML), or the like.

In this embodiment, a process for obtaining and editing (registering) the setting information is described while using an example of address book information. Note that "editing" of the setting information at the main unit 10 is described as, for example, "registration (new registration, setting change, and update)" as appropriate so as to be distinguished from editing at the control panel 20. Further, it is assumed that an operation instruction or operation input to the control panel 20 is provided by, for example, a touch operation on the control panel 20.

The setting information is information that can be, for example, obtained (and viewed) and edited by the control panel 20 or another external apparatus, and the address book information is regarded as the setting information. The setting information further includes various settings, such as parameters used in image formation (settings including a read resolution in a read job using a scanner, and print settings including a toner density and a color setting for printing) and an energy saving mode transition time, authentication settings including a role setting associated with user information used in granting an operation privilege by user authentication, and log settings including settings of a method for obtaining log information regarding image formation.

The address book information is information in which registered address information and so on are included. The address information and so on are registered by, for example, the user or the administrator of the image processing apparatus. The address information is information in which identification information of each individual is associated with an address. The address is information that is set as, for example, a transmission destination of image information, such as scan data or facsimile data, obtained as a result of image processing and that includes an email address, a facsimile number, and Uniform Resource Identifier (URI) information of a data storage destination.

The address information of each individual in the address book can form a group that includes a plurality of addresses. Group information increases viewability of an address list and is used in transmission of a scan job in a case of simultaneous transmission addressed to all addresses in a group that is set as a group of transmission destinations. In a description regarding FIG. 8 and the subsequent figures given below, a process for grouping pieces of address information of individuals registered as the address book information is described. In the process, the address book information has a data structure constituted by, for example, entry information, group information, and index information. In this data structure, the entry information corresponds to the address information and includes, for example, identification information of groups, such as department names and company names, other than individuals. Accordingly, the address information may include identification information of groups in addition to address information of individuals in accordance with the data structure.

Hardware Configuration

Figure 2:
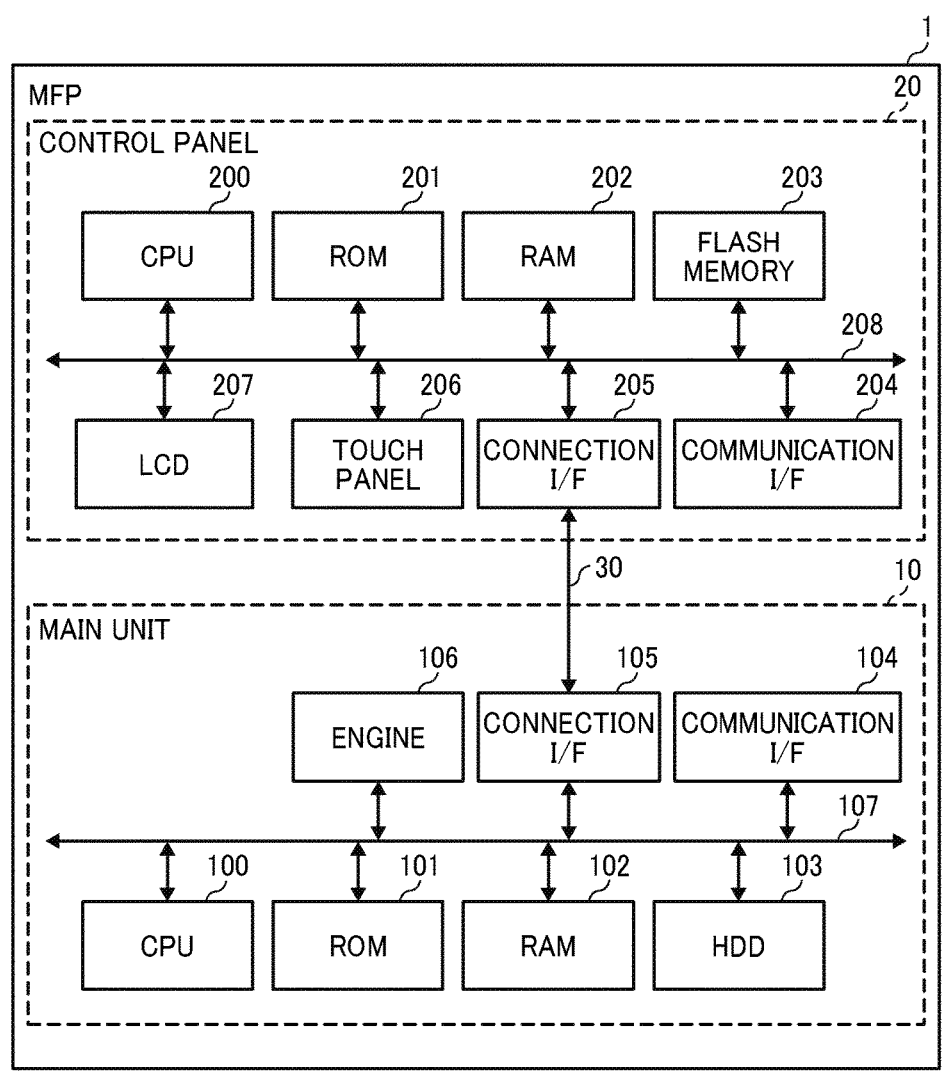
FIG. 2 is a diagram illustrating an exemplary hardware configuration of the MFP.

FIG. 2 illustrates an exemplary hardware configuration of the MFP 1. As illustrated in FIG. 2, the main unit 10 includes a central processing unit (CPU) 100, which is an example of a first CPU, a read-only memory (ROM) 101, a random access memory (RAM) 102, a hard disk drive (HDD) 103, a communication interface (I/F) 104, a connection I/F 105, and an engine 106. These units are connected to one another via a system bus 107.

The CPU 100 is a central arithmetic processing unit that performs arithmetic processing and control processing. The CPU 100 loads various programs stored in the ROM 101, the HDD 103, and so on to the RAM 102 and performs arithmetic processing and control processing to thereby centrally control the main unit 10.

The ROM 101 is a nonvolatile memory that stores permanent programs (for example, a basic input/output system (BIOS)). The RAM 102 is a volatile memory that is used as, for example, a work area when the CPU 100 performs various processes. The HDD 103 is an auxiliary storage device that stores various programs including a first operating system (OS), Web server software, Web APIs, and database management software as well as bulk data. The bulk data includes, for example, the address book information.

The communication I/F 104 is an interface (for example, an Ethernet (registered trademark) board) for the main unit 10 to establish a connection with a communication network, such as a local area network (LAN) or a virtual private network (VPN).

The connection I/F 105 is an interface compliant with, for example, a Universal Serial Bus (USB) standard for establishing a communication connection with the control panel 20 via the communication channel 30. The connection with the control panel 20 is not limited to the USB connection. The communication channel 30 is not limited to a wired channel and may be a wireless channel.

The engine 106 includes an image processing controller, a scanner for scanning and reading a document, and a plotter for printing on a recording medium, such as a sheet.

The control panel 20 illustrated in FIG. 2 includes a CPU 200, which is an example of a second CPU, a ROM 201, a RAM 202, a flash memory 203, a communication I/F 204, a connection I/F 205, a touch panel 206, and a liquid crystal display (LCD) 207 provided separately from the main unit 10. These units are connected to one another via a system bus 208.

The CPU 200 is a central arithmetic processing unit that performs arithmetic processing and control processing. The CPU 200 loads various programs stored in the ROM 201, the flash memory 203, and so on to the RAM 202 and performs arithmetic processing and control processing to thereby centrally control the control panel 20.

The ROM 201 is a nonvolatile memory that stores permanent programs (for example, a BIOS). The RAM 202 is a volatile memory that is used as, for example, a work area when the CPU 200 performs various processes. The flash memory 203 is an auxiliary storage device that stores a second OS (for example, Android OS), which is different from the OS of the main unit 10, applications (for example, Android applications) that are executed by the CPU 200 on the second OS, and so on.

The communication I/F 204 is an interface (for example, an Ethernet card) for the control panel 20 to establish a connection with a communication network, such as a LAN or a VPN.

The connection I/F 205 is an interface compliant with, for example, a USB standard for establishing a communication connection with the main unit 10 via the communication channel 30. The connection with the main unit 10 is not limited to the USB connection. The communication channel 30 is not limited to a wired channel and may be a wireless channel.

The touch panel 206 is an input device that detects the position of touching on the screen of the LCD 207 by an operator and communicates information about the detected position of touching to the CPU 200. As the input device, for example, hardware keys may be provided in addition to the touch panel 206.

The LCD 207 is an example of a display device that includes a liquid crystal display screen and that displays, on the display screen, screen information output from the CPU 200 to the LCD 207. As the display device, for example, an organic electroluminescence (EL) display device may be used instead of a liquid crystal display device.

Functional Configuration

In this embodiment, the main unit 10 and the control panel 20 of the MFP 1 separately operate on the different OSs (the first OS and the second OS, respectively). The applications of the control panel 20 each specify any of the Web APIs provided by the main unit 10 to use the functions of the main unit 10.

In the main unit 10, the CPU 100 loads to the RAM 102 and executes predetermined programs stored in the ROM 101, the HDD 103, and so on to thereby provide various functions relating to obtaining and editing of the address book information. In the control panel 20, the CPU 200 loads to the RAM 202 and executes predetermined programs stored in the ROM 201, the flash memory 203, and so on to thereby provide various functions relating to obtaining and editing of the address book information.

Figure 3:
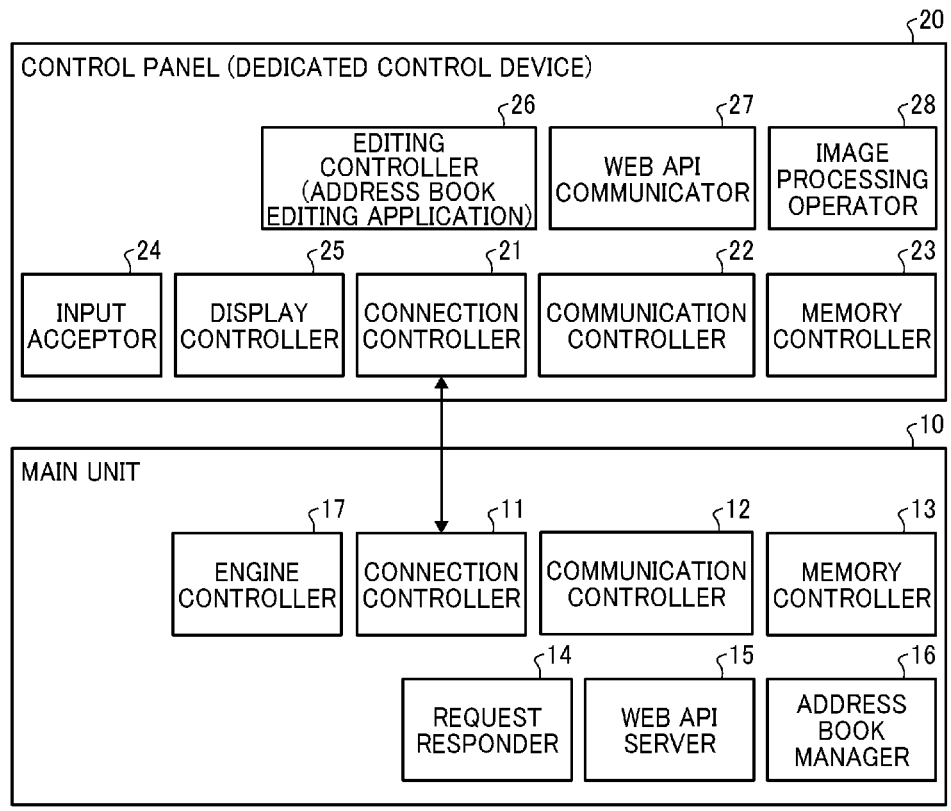
FIG. 3 is a diagram illustrating exemplary functions that relate to obtaining and editing of address book information and that are provided by a main unit and a control panel of the MFP.

FIG. 3 is a diagram illustrating exemplary functions that relate to obtaining and editing of the address book information and that are provided by the main unit 10 and the control panel 20 of the MFP 1. As illustrated in FIG. 3, the main unit 10 includes a connection controller 11, a communication controller 12, a memory controller 13, a request responder 14, a Web API server 15, an address book manager 16, and an engine controller 17. In this configuration, the memory controller 13 and the address book manager 16 (and the HDD 103) mainly correspond to a memory. The Web API server 15 mainly corresponds to a Web API service. The engine controller 17 (and the engine 106) mainly correspond to an image processing engine.

The connection controller 11 establishes communication with the control panel 20 by controlling the connection I/F 105 and exchanges data with the control panel 20.

The communication controller 12 establishes communication with a communication destination by controlling the communication I/F 104 and exchanges data with the communication destination. The communication controller 12 functions as, for example, a transmitter that establishes communication with a device having an address that is selected and specified by, for example, the control panel 20 and transmits, to the communication destination, image information obtained as a result of image processing by the engine controller 17 controlling the engine 106. The address is an address of an individual or a group registered as the address book information, which is stored on the main unit 10.

The memory controller 13 accesses the memory areas of the ROM 101, the RAM 102, the HDD 103, and so on, and reads and writes data.

The request responder 14 performs Hypertext Transfer Protocol (HTTP) communication with the control panel 20 and an external apparatus. Specifically, the request responder 14 performs a process for processing request data included in received data and returning the result of processing to the request sender through the HTTP communication. In a case where an API is specified in the request data, the request responder 14 uses the result of a process performed by the specified API among the plurality of APIs of the Web API server 15 as the result of processing.

The Web API server 15 includes the plurality of APIs for accepting obtaining or editing (registering) of the address book information and for giving an instruction for a data operation of the address book information to the address book manager 16 in accordance with the operation type. Each API gives an instruction for a data operation to the address book manager 16 by using an order in the Structured Query Language (SQL). The request responder 14 and the Web API server 15 are implemented as a Web server provided in the main unit 10 of the MFP 1. The request responder 14 and the Web API server 15 give instructions for processing to the address book manager 16, the engine controller 17, and so on of the main unit 10 and make responses to the control panel 20 and an external apparatus as processing performed in response to requests from the control panel 20 and the external apparatus.

The address book manager 16 manages the address book information stored in the HDD 103 by using information tables. Management described here includes association of information and operations of information. Specifically, the address book manager 16 associates various types of information including identification information of individuals and addresses stored in the HDD 103 by using information tables and stores the various types of information as the address book information. The address book manager 16 accesses, in response to an instruction for a data operation for a certain information table from an API of the Web API server 15, the information table via the memory controller 13 and performs the specified data operation, such as extraction, new registration, update, or deletion of data in the address book information.

The engine controller 17 controls the engine 106 by, for example, setting a parameter value for the engine 106. For example, the engine controller 17 sets a parameter value for the engine 106 on the basis of an operation signal from the control panel 20.

The control panel 20 includes a connection controller 21, a communication controller 22, a memory controller 23, an input acceptor 24, a display controller 25, an editing controller (address book editing application) 26, a Web API communicator 27, and an image processing operator 28. In this configuration, the input acceptor 24, the editing controller 26, and the image processing operator 28 mainly correspond to an acceptor. The connection controller 21, the editing controller 26, and the Web API communicator 27 mainly correspond to a communicator. The display controller 25 and the editing controller 26 mainly correspond to a display.

The connection controller 21 establishes communication with the main unit 10 by controlling the connection I/F 205 and exchanges data with the main unit 10. For example, the connection controller 21 transmits an operation signal for image processing to the connection controller 11 of the main unit 10. The connection controller 21 exchanges, with the connection controller 11 of the main unit 10, information used in, for example, editing (including obtaining) the address book information and selecting a transmission destination of image information.

The communication controller 22 establishes communication with a communication destination by controlling the communication I/F 204 and exchanges data with the communication destination.

The memory controller 23 accesses the memory areas of the ROM 201, the RAM 202, the flash memory 203, and so on, and reads and writes data.

The input acceptor 24 accepts information about the position of touching from the touch panel 206.

The display controller 25 outputs screen information to the LCD 207 to control display.

The editing controller 26 edits the address book information interactively with the operator of the control panel 20. In a case of editing the address book information, the editing controller 26 instructs the display controller 25 to display screen information, accepts edit information input by the operator via the input acceptor 24, instructs the Web API communicator 27 to transmit request data to the main unit 10, and receives response data from the main unit 10 via the Web API communicator 27.

The Web API communicator 27 performs HTTP communication with the request responder 14 of the main unit 10. Specifically, the Web API communicator 27 transmits a request based on user input accepted by the editing controller 26 through the UI of the control panel 20 to the Web server (including the request responder 14 and Web API service) of the main unit 10 by using an HTTP client. In the HTTP communication, the Web API communicator 27 specifies an API of the Web API server 15 and receives the result of processing performed by the API.

The image processing operator 28 accepts an operation for image processing interactively from the operator of the control panel 20. For example, the image processing operator 28 instructs the display controller 25 to display screen information, accepts an operation input by the operator via the input acceptor 24, and instructs the connection controller 21 to transmit an operation signal to the main unit 10. The image processing operator 28 may perform an operation for image processing in the main unit 10 via an API for image processing provided by the main unit 10.

Figure 4:
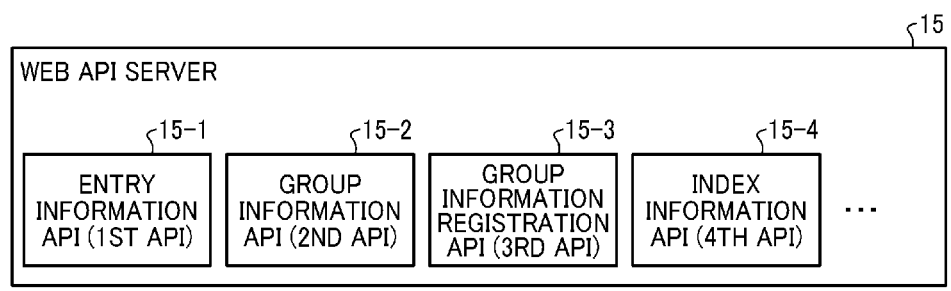
FIG. 4 is a diagram illustrating a plurality of exemplary application programming interfaces (APIs) of a Web API server for respective operation types.

FIG. 4 is a diagram illustrating a plurality of exemplary APIs of the Web API server 15 for respective operation types. As illustrated in FIG. 4, the Web API server 15 includes an entry information API (first API) 15-1, a group information API (second API) 15-2, a group information registration API (third API) 15-3, and an index information API (fourth API) 15-4 as the APIs. Among these APIs, the entry information API is an example of an address information API, and the group information registration API is an example of a registration API.

Here, it is assumed that, for example, the path of the entry information API 15-1 is "ricoh/address/entries", the path of the group information API 15-2 is "ricoh/address/groups", the path of the group information registration API 15-3 is "ricoh/address/groups", and the path of the index information API 15-4 is "ricoh/address/tags". The path of the group information API 15-2 and the path of the group information registration API 15-3 are the same, and therefore, the group information API 15-2 and the group information registration API 15-3 are the same and are selectively used in accordance with the method type. These APIs are separately described herein for convenience sake.

FIG. 5 is a diagram for describing the functions of the APIs of the Web API server 15. FIG. 5 illustrates an example case under the assumption that the address book manager 16 manages the address book information by using a database DB that includes an entry table (first information table) T1

(see FIG. 7), a group table (second information table) T2 (see FIG. 7), and an index table (third information table) T3 (see FIG. 7) described below.

The entry information API 15-1 obtains part or all of entry information about individuals and groups managed in the entry table T1 by using a GET method. The entry information will be described below.

The group information API 15-2 obtains group information managed in the group table T2 by using a GET method. The group information will be described below.

The group information registration API 15-3 registers group edit information in the group table T2 by using a POST method. The group edit information is edit information about a group in the address book information edited at the control panel 20. The group edit information will be described in detail below.

The index information API 15-4 obtains all index information managed in the index table T3 by using a GET method. The index information will be described below.

In addition to the above-described functions, each API functions so as to, for example, add or delete data by changing the method. For example, the entry information API 15-1 functions so as to add entry information for one entry to the entry table T1 by using a POST method. The group information API 15-2 functions so as to delete group information for all groups managed in the group table T2 by using a DELETE method.

Structure of Request Data

Now, request data that is transmitted to the main unit 10 by the Web API communicator 27 is described. Here, as the request data, request data having a structure that includes a method and a URI for identifying a resource is described. Data exchanged with the main unit 10 via HTTP communication is in the form of, for example JSON.

FIG. 6A is a diagram illustrating an exemplary structure of index information request data (first request data) that is transmitted to the main unit 10 by the Web API communicator 27. The index information request data is request data that is used in a case of receiving from the editing controller 26 an instruction for collectively obtaining index information.

As illustrated in FIG. 6A, in the index information request data, GET is specified as the method, and the path of the index information API 15-4 (see FIG. 4) is specified as the URI. The path of the index information API 15-4 is "ricoh/address/tags", which is specified as the URI in this example.

FIG. 6B is a diagram illustrating an exemplary structure of entry information request data (second request data) that is transmitted to the main unit 10 by the Web API communicator 27. The entry information request data is request data that is used in a case of receiving from the editing controller 26 an instruction for obtaining entry information for one entry in the entry table T1.

As illustrated in FIG. 6B, in the entry information request data, GET is specified as the method, and the path of the entry information API 15-1 (see FIG. 4) is specified as the URI. The path of the entry information API 15-1 is "ricoh/address/entries", which is specified as the URI in this example.

FIG. 6C is a diagram illustrating an exemplary structure of group information request data (third request data) that is transmitted to the main unit 10 by the Web API communicator 27. The group information request data is request data that is used in a case of receiving from the editing controller 26 an instruction for obtaining group information in the group table T2.

As illustrated in FIG. 6C, in the group information request data, GET is specified as the method, and the path of the group information API 15-2 (see FIG. 4) is specified as the URI. The path of the group information API 15-2 is "ricoh/address/groups", which is specified as the URI in this example.

FIG. 6D is a diagram illustrating an exemplary structure of group information registration request data (fourth request data) that is transmitted to the main unit 10 by the Web API communicator 27. The group information registration request data is request data that is used in a case of receiving from the editing controller 26 an instruction for registering group information in the group table T2.

As illustrated in FIG. 6D, in the group information registration request data, POST is specified as the method, and the path of the group information registration API 15-3 (see FIG. 4) is specified as the URI. The path of the group information registration API 15-3 is "ricoh/address/groups", which is specified as the URI in this example.

Table Structure

Now, the structures of the information tables for the address book information managed by the address book manager 16 of the main unit 10 are described.

Figure 7:
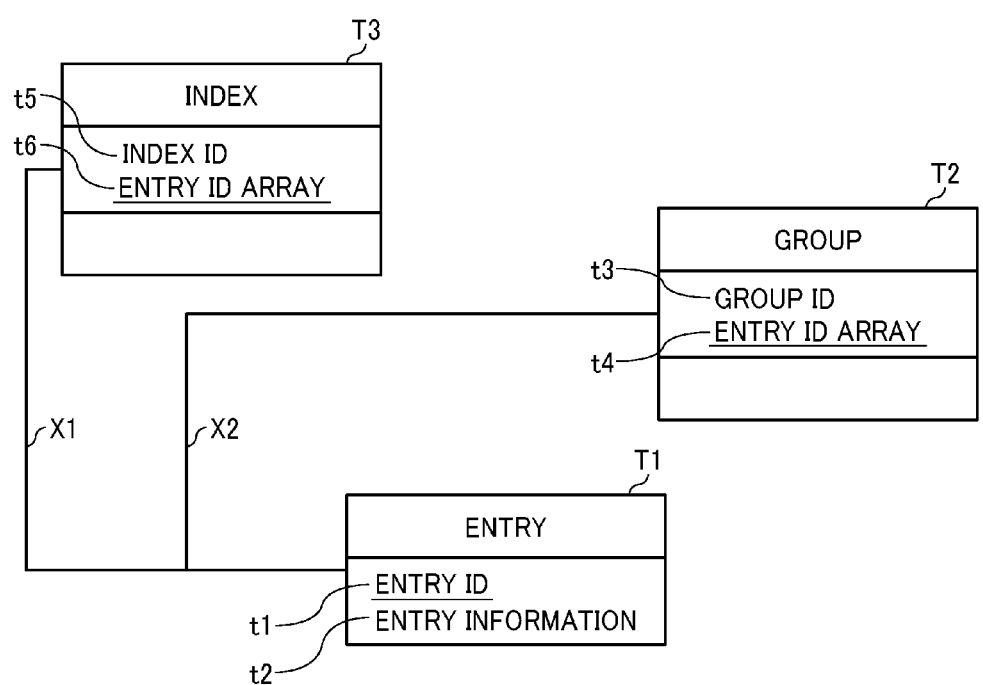
FIG. 7 is a diagram illustrating correlations between information tables managed by an address book manager.

FIG. 7 is a diagram illustrating correlations between the information tables managed by the address book manager 16. The entry table T1 is an information table for managing entry information (address information) of each individual and each group. In the entry table T1, an entry ID t1, which is issued, is associated with entry information t2. The entry ID t1 and the entry information t2 are combined to form address information.

The group table T2 is an information table for managing group information. In the group table T2, a group ID t3 is associated with an entry ID array t4, which is an array of the entry IDs of group members of the group.

The index table T3 is an information table for managing index information. In the index table T3, an index ID t5 is associated with an entry ID array t6.

In these table structures, an entry ID included in the entry ID array t4 in the group table T2, an entry ID included in the entry ID array t6 in the index table T3, and so on are managed by using the entry ID t1 in the entry table T1, as indicated by lines X1 and X2 in FIG. 7, which represent the correlations.

FIG. 8 is a diagram illustrating an exemplary data structure of the entry table T1. FIG. 8 illustrates an entry table T10, which includes an entry ID t10 and entry information t11.

The entry ID t10 is an example of the entry ID t1 and includes an ID for uniquely managing the entry information t11. Regarding the entry ID t10, identification information, such as, for example, "c", is added to an ID that indicates a group so that an individual and a group can be distinguished from each other. The identification information may be, for example, a number.

The entry information t11 is an example of the entry information t2 and includes an entry type t110, a displayed name t111, and an email address t112, a facsimile number t113, and/or a transmission destination folder t114, which are addresses.

The entry type t110 is information for identifying the entry type of, for example, user, address, or group. Hereinafter, entry information (address information) for which the entry type is user or address is described as "individual entry information", and entry information (address information) for which the entry type is group is described as "group entry information".

The displayed name t111 is the name of an entered individual or group that is displayed on a UI screen.

FIG. 9 is a diagram illustrating an exemplary data structure of the group table T2. FIG. 9 illustrates a group table T20, which includes a group ID t20, a displayed name t21, the number of entries t22, and an entry ID array t23.

The group ID t20 is an example of the group ID t3 and includes an ID for uniquely identifying a group. The displayed name t21 is a group name that is displayed on a UI screen. The number of entries t22 is the number of entries of group members of the group indicated by the group ID t20. The entry ID array t23 is an example of the entry ID array t4 and includes the entry IDs of the group members of the group indicated by the group ID t20.

The group information is information that indicates relationships between a group and group members of the group and is information that mainly indicates relationships between the group ID t20 and the entry ID array t23.

FIG. 10 is a diagram illustrating an exemplary data structure of the index table T3. FIG. 10 illustrates an index table T30, which includes an index ID t30, a displayed name t31, the number of entries t32, and an entry ID array t33.

The index ID t30 is an example of the index ID t5 and includes an ID for uniquely identifying an index. The displayed name t31 is an index that is displayed on a UI screen. The number of entries t32 is the number of entries of entry IDs that belong to the index indicated by the index ID t30 and, in this example, indicates the total number of entries of entry IDs of individuals and groups. The entry ID array t33 is an example of the entry ID array t6 and includes entry IDs of individuals and groups that belong to the index indicated by the index ID t30.

The index information is information that indicates relationships between an index, and individuals and groups that belong to the index and, in this example, is information that mainly indicates relationships between the index ID t30 and the entry ID array t33. The index is an index, such as "A-column" or "KA-column", for classifying entry information about an individual or a group in accordance with the character string of the individual name or the group name.

Processing by MFP 1

Figure 12:
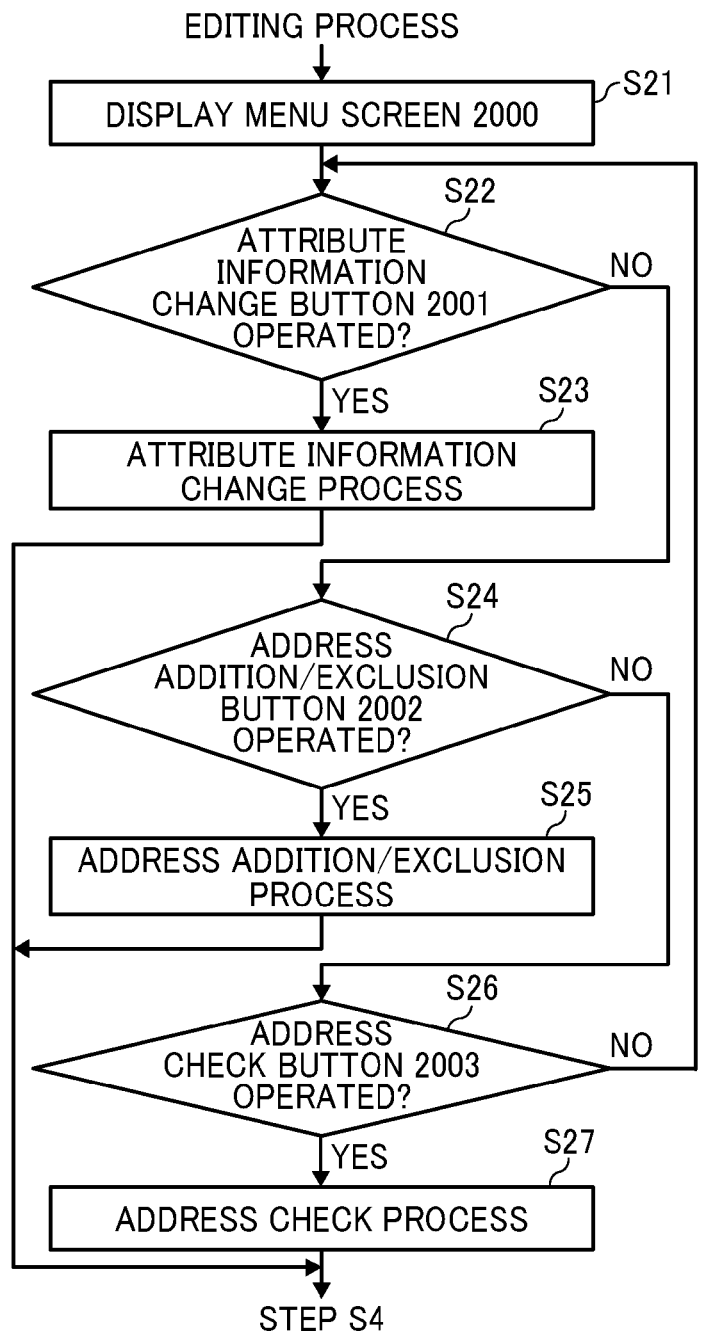
FIG. 12 is a flowchart illustrating an exemplary editing process.
Figure 13:
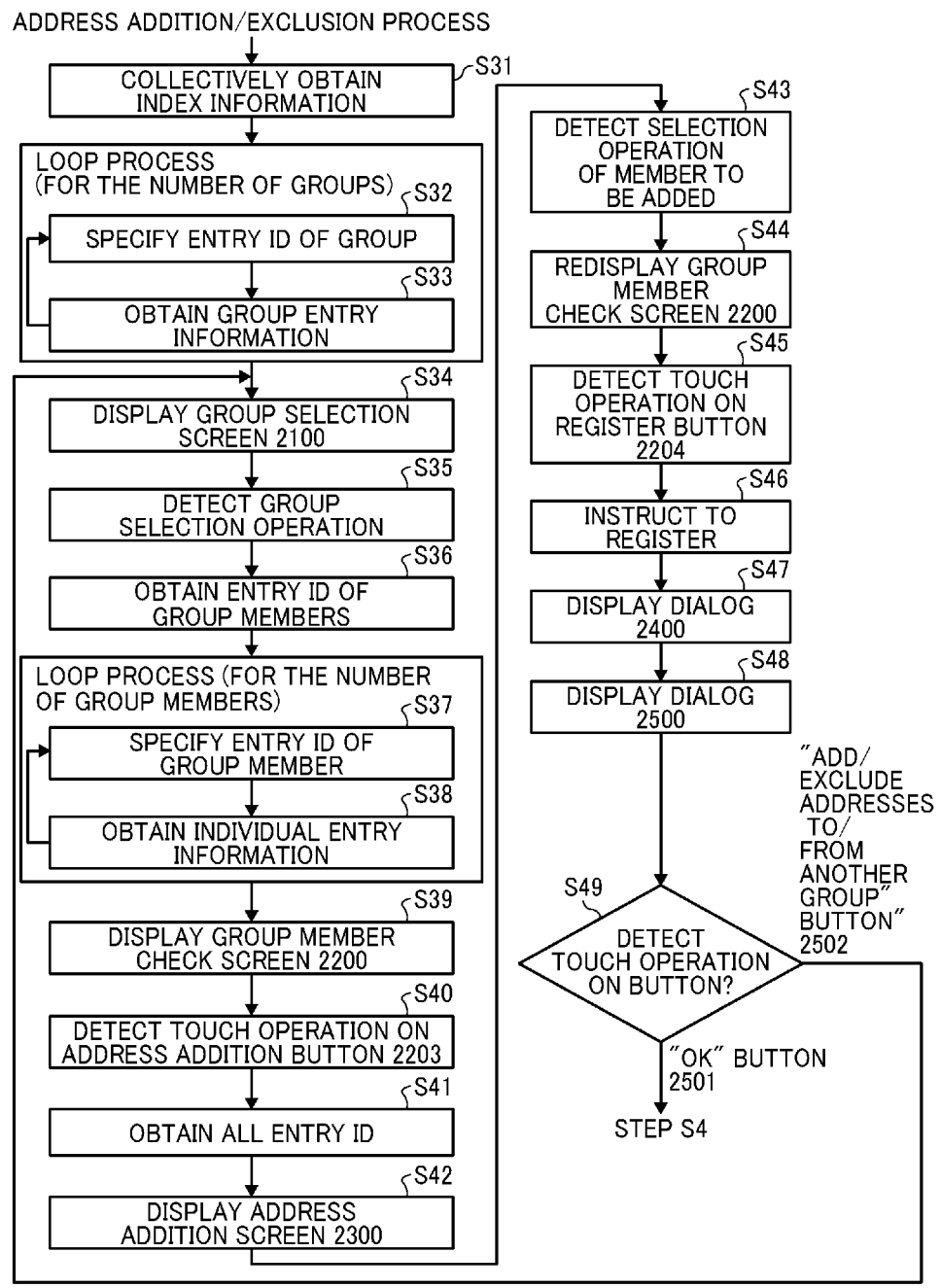
FIG. 13 is a flowchart illustrating an exemplary address addition/exclusion process.

Now, an operation of the MFP 1 in a case of editing (including obtaining) the address book information in the main unit 10 at the control panel 20 is described. First, processing performed by the control panel 20 illustrated in FIG. 11 to FIG. 13 is described while referring to the screen flows of the control panel 20 illustrated in FIG. 14 and FIG. 15 as appropriate.

Processing Performed by Control Panel 20

Figure 11:
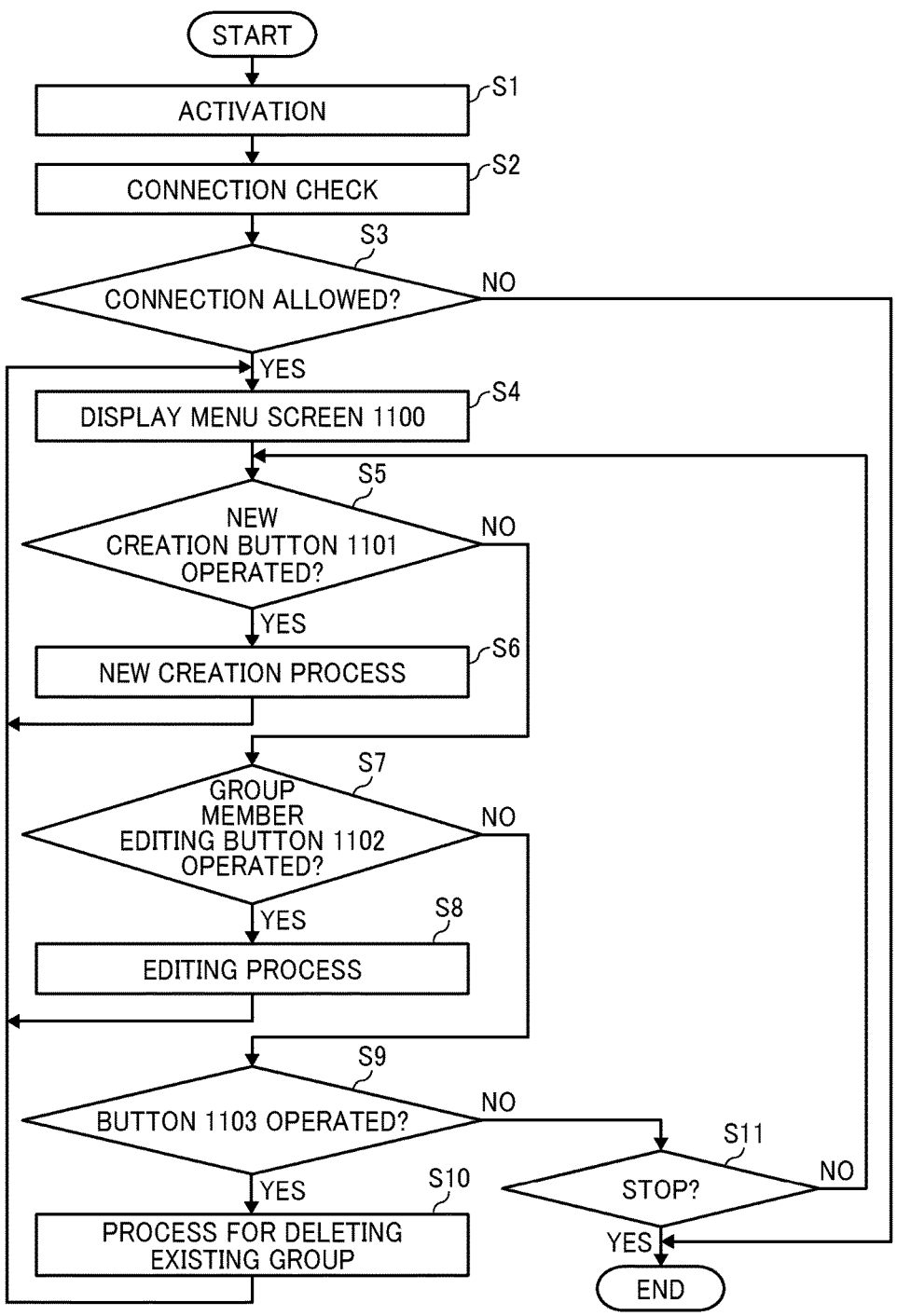
FIG. 11 is a flowchart illustrating an exemplary process from activation of an address book editing application to display of a menu screen for group editing.

FIG. 11 is a diagram illustrating an exemplary process from activation of an address book editing application to display of a menu screen for group editing. First, when a touch operation is performed on an icon 1001 (see FIG. 14) of an address book editing application on a home screen 1000 (see FIG. 14), the editing controller 26 is activated (step S1). The touch operation may be replaced by a key operation, and the same applies to touch operations described below. It is hereinafter assumed that a touch operation performed on various buttons is an operation of pressing the buttons.

In the activation process, the editing controller 26 instructs the Web API communicator 27 to transmit data for a connection check to the request responder 14 of the main unit 10 (step S2).

Subsequently, when receiving connection check information returned from the request responder 14 of the main unit 10 via the Web API communicator 27, the editing controller 26 determines whether the connection check information is information indicating that connection is allowed (step S3).

If the connection check information is information indicating that connection is allowed (Yes in step S3), the editing controller 26 instructs the display controller 25 to display a menu screen 1100 (see FIG. 14) of the address book editing application, completes the activation, prepares for accepting input from the input acceptor 24, and waits for input (step S4). If the connection check information is information indicating that connection is not allowed (No in step S3), the editing controller 26, for example, instructs the display controller 25 to display a dialog box for a notification of unallowable connection and ends the address book editing application.

On the menu screen 1100 (see FIG. 14) of the address book editing application, buttons for three types of processes, namely, a creation button 1101 used to group pieces of address information, a group member editing button 1102 used to edit information about group members of an existing group, and a button 1103 used to delete an existing group, are provided.

After the process in step S4, the editing controller 26 determines whether a touch operation is performed on the creation button 1101 on the basis of input information accepted by the input acceptor 24 (step S5). If the input information is information indicating a touch operation performed on the creation button 1101 (Yes in step S5), the editing controller 26 performs a creation process (step S6). After the creation process, the flow return to step S4, and the editing controller 26 gives an instruction for displaying the menu screen 1100 of the address book editing application and waits for the next input.

If the input information is not information indicating a touch operation performed on the creation button 1101 (No in step S5), the editing controller 26 determines whether a touch operation is performed on the group member editing button 1102 on the basis of input information accepted by the input acceptor 24 (step S7). If the input information is information indicating a touch operation performed on the group member editing button 1102 (Yes in step S7), the editing controller 26 performs an editing process (step S8). After the editing process, the flow returns to step S4, and the editing controller 26 gives an instruction for displaying the menu screen 1100 of the address book editing application and waits for the next input.

If the input information is not information indicating a touch operation performed on the group member editing button 1102 (No in step S7), the editing controller 26 determines whether a touch operation is performed on the button 1103 on the basis of input information accepted by the input acceptor 24 (step S9). If the input information is information indicating a touch operation performed on the button 1103 (Yes in step S9), the editing controller 26 performs a process for deleting an existing group (step S10). After this process, the flow returns to step S4, and the editing controller 26 gives an instruction for displaying the menu screen 1100 of the address book editing application and waits for the next input.

If the input information is not information indicating a touch operation performed on the button 1103 (No in step S9), the editing controller 26 determines whether a touch operation is performed on a stop button 1104 (see FIG. 14) on the basis of input information accepted by the input acceptor 24 (step S11). If the input information is information indicating a touch operation performed on the stop button 1104 (Yes in step S11), the editing controller 26 ends the program of the address book editing application. If the input information is not information indicating a touch operation performed on the stop button 1104 (No in step S11), the flow returns to step S5, and the editing controller 26 repeats the process.

Editing Process

Next, a specific example of the editing process in step S8 in FIG. 11 is described. The editing process is a process for editing information about group members of an existing group.

FIG. 12 is a diagram illustrating an exemplary editing process that is performed after the determination that a touch operation has been performed on the group member editing button 1102. First, the editing controller 26 instructs the display controller 25 to display a menu screen 2000 (see FIG. 15) for group editing, prepares for accepting input from the input acceptor 24, and waits for input (step S21).

On the menu screen 2000 (see FIG. 15) for group editing, an attribute information change button 2001 used to change attribute information about an existing group, an address addition/exclusion button 2002 used to change group members of an existing group, and an address check button 2003 used to check group members of an existing group are provided.

After the process in step S21, the editing controller 26 determines whether a touch operation is performed on the attribute information change button 2001 on the basis of input information accepted by the input acceptor 24 (step S22). If the input information is information indicating a touch operation performed on the attribute information change button 2001 (Yes in step S22), the editing controller 26 performs an attribute information change process for, for example, changing the group name (step S23). After the attribute information change process, the flow returns to step S4 (see FIG. 11), and the editing controller 26 gives an instruction for displaying the menu screen 1100 of the address book editing application and waits for the next input.

If the input information is not information indicating a touch operation performed on the attribute information change button 2001 (No in step S22), the editing controller 26 determines whether a touch operation is performed on the address addition/exclusion button 2002 on the basis of input information accepted by the input acceptor 24 (step S24). If the input information is information indicating a touch operation performed on the address addition/exclusion button 2002 (Yes in step S24), the editing controller 26 performs an address addition/exclusion process described below (step S25).

If the input information is not information indicating a touch operation performed on the address addition/exclusion button 2002 (No in step S24), the editing controller 26 determines whether a touch operation is performed on the address check button 2003 on the basis of input information accepted by the input acceptor 24 (step S26). If the input information is not information indicating a touch operation performed on the address check button 2003 (No in step S26), the flow returns to step S22. If the input information is information indicating a touch operation performed on the address check button 2003 (Yes in step S26), the editing controller 26 performs an address check process, such as a process for obtaining group list information from the main unit 10 and a process for obtaining from the main unit 10 entry information about group members of a group that is selected from the group list information (step S27). After the address check process, the flow returns to step S4 (see FIG. 11), and the editing controller 26 gives an instruction for displaying the menu screen 1100 of the address book editing application and waits for the next input.

In the processes performed by the editing controller 26 in response to a touch operation performed on the attribute information change button 2001, the address addition/exclusion button 2002, and the address check button 2003 on the menu screen 2000 (see FIG. 15) for group editing, communication is performed with the main unit 10, and the APIs of the main unit 10 are used. In this embodiment, as an exemplary process in which the APIs of the main unit 10 are used, the address addition/exclusion process (step S25) is described.

If the input information is information indicating a touch operation performed on the address addition/exclusion button 2002 (Yes in step S24), the editing controller 26 performs the address addition/exclusion process in accordance with a procedure described below.

FIG. 13 is a flowchart illustrating an exemplary address addition/exclusion process. First, the editing controller 26 instructs the Web API communicator 27 to collectively obtain index information (step S31).

Subsequently, when receiving from the Web API communicator 27 a notification that the index information has been obtained, the editing controller 26 specifies one of the entry IDs of groups in the index information (step S32). The entry ID of a group included in the index information is distinguished on the basis of the identification information "c" added to the ID.

The editing controller 26 instructs the Web API communicator 27 to obtain entry information (group entry information) corresponding to the specified entry ID (step S33).

When receiving from the Web API communicator 27 a notification that the group entry information corresponding to the entry ID has been obtained, the editing controller 26 repeats the processes in step S32 and step S33 for the number of entry IDs of the remaining groups included in the index information and instructs the Web API communicator 27 to obtain group entry information for each of the entry IDs of the remaining groups one by one. The editing controller 26 temporarily stores all group entry information that has been obtained in the RAM 202 as information that is set in group selection screen information.

Subsequently, the editing controller 26 sets the group entry information that has been obtained for all of the entry IDs in the group selection screen information, instructs the display controller 25 to display the group selection screen information, prepares for accepting input from the input acceptor 24, and waits for input (step S34).

On a group selection screen 2100 (see FIG. 15), a plurality of tabs 2101 are provided. In the tabs 2101, the displayed names of indexes that are set are displayed. Each of the tabs 2101 has a tab area 2102 in which selection buttons 2103 for pieces of group entry information about groups corresponding to the index of the tab 2101 are arranged.

When a group is selected by a touch operation performed on a corresponding one of the selection buttons 2103 and a touch operation is further performed on a "next" button 2104 on the group selection screen 2100 (see FIG. 15), the editing controller 26 detects the operation (step S35) and instructs the Web API communicator 27 to obtain the entry IDs of the group members of the selected group (step S36).

Subsequently, when receiving from the Web API communicator 27 a notification that the entry IDs of the group members have been obtained, the editing controller 26 specifies one of the obtained entry IDs of the group members (step S37).

The editing controller 26 instructs the Web API communicator 27 to obtain entry information (individual entry information) corresponding to the specified entry ID (step S38).

When receiving from the Web API communicator 27 a notification that the individual entry information corresponding to the entry ID has been obtained, the editing controller 26 repeats the processes in step S37 and step S38 for the number of the remaining entry IDs among the entry IDs of the group members and instructs the Web API communicator 27 to obtain individual entry information for each of the remaining entry IDs one by one. The editing controller 26 temporarily stores all individual entry information that has been obtained in the RAM 202 as information that is set in group member check screen information.

Subsequently, the editing controller 26 sets the displayed name of the selected group and the individual entry information about the group members of the group in the group member check screen information, instructs the display controller 25 to display the group member check screen information, prepares for accepting input from the input acceptor 24, and waits for input (step S39).

On a group member check screen 2200 (see FIG. 15), a group name display area 2201, a group member list display area 2202, an address addition button 2203, which serves as an "addition button", a register button 2204, and so on are provided. In the group name display area 2201, the displayed name of the group is displayed. In the group member list display area 2202, individual entry information (mainly, the displayed name) of each group member is displayed, and an exclusion button (corresponding to a "deletion button") 2205 is arranged for each member. In this example, the address addition button 2203 and the exclusion buttons 2205 correspond to an "editing button".

When a touch operation is performed on the address addition button 2203 on the group member check screen 2200 (see FIG. 15), the editing controller 26 detects the operation (step S40) and performs, for example, an editing process from step S41 to step S44. Specifically, the editing controller 26 first instructs the Web API communicator 27 to obtain all entry IDs (step S41).

Subsequently, when receiving from the Web API communicator 27 a notification that all entry IDs have been obtained, the editing controller 26 sets, in address addition screen information, individual entry information about individuals other than the existing group members of the group from all entry information, instructs the display controller 25 to display the address addition screen information, prepares for accepting input from the input acceptor 24, and waits for input (step S42).

On an address addition screen 2300 (see FIG. 15), a plurality of tabs 2301 are provided. In the tabs 2301, the displayed names of indexes that are set are displayed. Each of the tabs 2301 has a tab area 2302 in which selection buttons 2303 for individuals corresponding to the index of the tab 2301 are arranged. Further, an "OK" button 2304, a "cancel" button 2305, and so on are provided.

When a member to be added is selected by a touch operation performed on a corresponding one of the selection buttons 2303 and a touch operation is further performed on the "OK" button 2304 on the address addition screen 2300 (see FIG. 15), the editing controller 26 detects the operation (step S43). The editing controller 26 arranges a button for the member to be added in the group member list display area 2202 of the group member check screen 2200 (see FIG. 15), instructs the display controller 25 to refresh the display, prepares for accepting input from the input acceptor 24, and waits for input (step S44).

Subsequently, when a touch operation is performed on the register button 2204, the editing controller 26 detects the operation (step S45).

The editing controller 26 instructs the Web API communicator 27 to register the entry ID of the group member for which editing has been performed for the group ID of the group for which editing is being performed (step S46) and further instructs the display controller 25 to display a dialog 2400 (see FIG. 15) indicating that registration is ongoing (step S47). In a case where one of the exclusion buttons 2205 is operated on the group member check screen 2200 (see FIG. 15), the editing controller 26 instructs the Web API communicator 27 to delete the entry ID of the member for which the exclusion button 2205 has been operated for the group ID of the group for which editing is being performed as a deletion process, which is one type of the editing process.

Subsequently, when receiving from the Web API communicator 27 a notification of registration of the entry ID, the editing controller 26 instructs the display controller 25 to display a dialog 2500 (see FIG. 15) indicating "completion of registration", which is the result of editing, prepares for accepting input from the input acceptor 24, and waits for input (step S48). On the dialog 2500 (see FIG. 15) indicating "completion of registration", an "OK" button 2501 and an "add/exclude addresses to/from another group" button 2502 are provided.

Subsequently, the editing controller 26 detects a touch operation performed on the "OK" button 2501 or the "add/exclude addresses to/from another group" button 2502 (step S49).

If a touch operation is performed on the "add/exclude addresses to/from another group" button 2502, the flow returns to step S34, and the editing controller 26 performs the process in accordance with a similar procedure.

If a touch operation is performed on the "OK" button 2501, the flow returns to step S4.

Communication Process Between Web API Communicator and Main Unit

Now, a communication process between the Web API communicator 27 and the main unit 10 performed upon execution of the address book editing application is described. For example, a communication process that is performed in a case of performing the editing process (see FIG. 13) for editing information about group members of an existing group is described below.

Figure 16B:
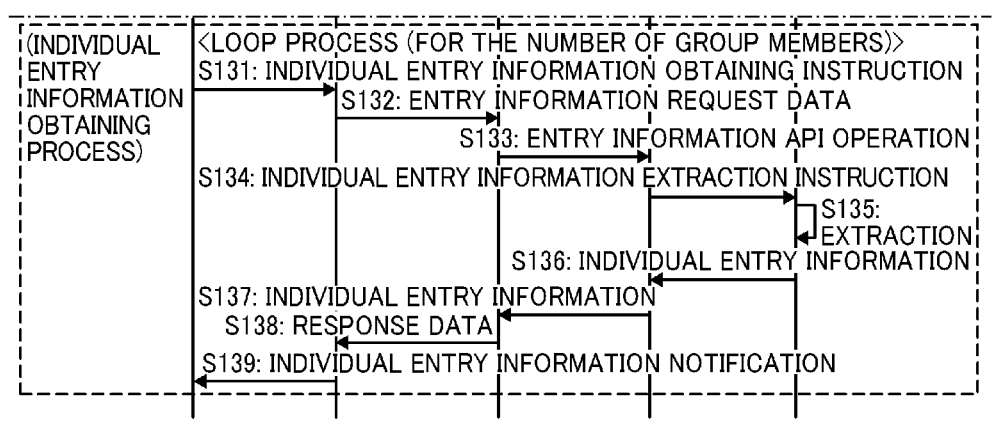
Figure 17:
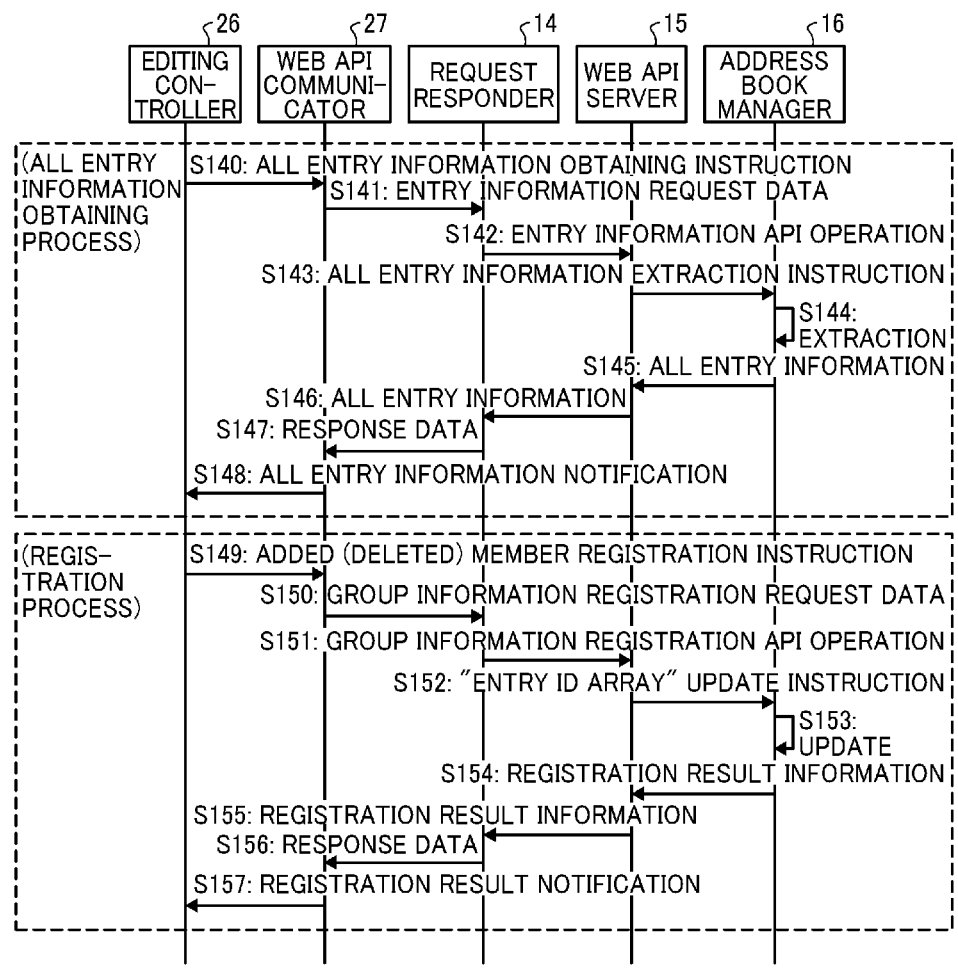

FIG. 16 and FIG. 17 are sequence charts illustrating an exemplary sequence of the communication process between the control panel 20 and the main unit 10. First, when the operator performs a touch operation on the icon 1001 (see FIG. 14) of the address book editing application, the editing controller 26, the Web API communicator 27, and so on are activated.

After activated, the Web API communicator 27 receives instruction information for a connection check for checking connection with the main unit 10 from the editing controller 26 (step S100) and transmits request data for a connection check to the request responder 14 of the main unit 10 in accordance with the instruction (step S101). Specifically, the Web API communicator 27 transmits to the main unit 10 request data for checking connection in which the URI of the main unit 10 is set. When receiving the request data, the request responder 14 checks to see if communication with the control panel 20 is allowed and to see if all of the predetermined APIs are available and transmits information indicating the result of the check to the Web API communicator 27.

Subsequently, when receiving the information indicating that connection is allowed from the request responder 14 (step S102), the Web API communicator 27 sends to the editing controller 26 a notification that communication is allowed (step S103).

The editing controller 26 instructs the display controller 25 to display the menu screen 1100 (see FIG. 14) of the address book editing application. Thereafter, when the operator performs a touch operation on the group member editing button 1102 (see FIG. 14) on the menu screen 1100 (see FIG. 14), the editing controller 26 instructs the display controller 25 to display the menu screen 2000 (see FIG. 15) for group editing.

Subsequently, when the operator performs a touch operation on the address addition/exclusion button 2002 (see FIG. 15) on the menu screen 2000 (see FIG. 15) for group editing, the Web API communicator 27 receives from the editing controller 26 instruction information for collectively obtaining index information (step S104) and transmits "GET:/ricoh/address/tags" (see FIG. 6A) to the request responder 14 of the main unit 10 as index information request data (to execute an API) (step S105). The address addition/exclusion button 2002 is a button used to start editing an address book included in the setting information and can be regarded as an edit start button. Any button that is appropriate for starting editing of an address book included in the setting information other than the address addition/exclusion button 2002 may be called an edit start button.

When accepting the index information request data, the request responder 14 of the main unit 10 operates the index information API 15-4 of the Web API server 15 (see FIG. 4) (step S106).

The Web API server 15 (index information API 15-4) instructs the address book manager 16 to extract all index information in the index table T3 (see FIG. 10) (step S107). The address book manager 16 extracts all index information in the index table T3 in accordance with the instruction (step S108).

The Web API server 15 (index information API 15-4) receives from the address book manager 16 the index information obtained as a result of the extraction process (step S109) and passes the index information to the request responder 14 (step S110).

When receiving the index information from the Web API server 15 (index information API 15-4), the request responder 14 includes the index information in response data (display information in the JSON format, the same applies to response data described below) and transmits the response data to the Web API communicator 27, which is the request sender (step S111).

When receiving the response data from the request responder 14, the Web API communicator 27 sends to the editing controller 26 a notification that the index information has been obtained (step S112).

When receiving from the Web API communicator 27 the notification that the index information has been obtained, the editing controller 26 specifies one of the entry IDs of groups in the index information and instructs the Web API communicator 27 to obtain entry information (that is, group entry information) corresponding to the specified entry ID (step S113). Specifically, after obtaining indexes, the editing controller 26 obtains entry information corresponding to "c1" and "c2", which represent group entry information and which are included in an entry ID array that corresponds to the index ID "B1", which is the ID of the index "All" displayed first. Each time the operator selects the tag of an index, the editing controller 26 obtains group entry information corresponding to the entry IDs of groups belonging to the index.

The Web API communicator 27 adds the one entry ID (the entry ID of a group) specified by the editing controller 26 to the URI in entry information request data (see FIG. 6B) as a request parameter and transmits the entry information request data to the request responder 14 of the main unit 10 (to execute an API) (step S114). Specifically, the Web API communicator 27 sets an identifier for "entry ID" as the key and sets the one entry ID as the value for the URI in entry information request data (see FIG. 6B). For example, in a case of obtaining group entry information corresponding to "c1" (Administration Dept.) in FIG. 8, a function that includes a description "GET:/ricoh/address/entries/c1" is transmitted from the control panel 20 to the Web server (including the request responder 14 and Web API service) of the main unit 10, where "c1" in the function is a group ID and corresponds to the value.

When accepting the entry information request data, the request responder 14 of the main unit 10 operates the entry information API 15-1 of the Web API server 15 (see FIG. 4) (step S115).

The Web API server 15 (entry information API 15-1) specifies "key: entry ID" and "value: the one entry ID (in this case, for example, "c1", which indicates the entry ID of a group)" added as request parameters as extraction targets and instructs the address book manager 16 to extract entry information (group entry information) from the entry table T1 (step S116). The address book manager 16 extracts one specified piece of group entry information from the entry table T1 in accordance with the instruction (step S117).

The Web API server 15 (entry information API 15-1) receives the one piece of group entry information obtained as a result of the extraction process from the address book manager 16 (step S118) and passes the group entry information to the request responder 14 (step S119).

When receiving the group entry information from the Web API server 15 (entry information API 15-1), the request responder 14 includes the group entry information in response data and transmits the response data to the Web API communicator 27, which is the request sender (step S120).

When receiving the response data from the request responder 14, the Web API communicator 27 sends to the editing controller 26 a notification that the specified one piece of group entry information has been obtained (step S121).

When receiving from the Web API communicator 27 the notification that the specified one piece of group entry information has been obtained, the editing controller 26 specifies another one of the entry IDs of groups in the index information and obtains one piece of group entry information corresponding to the specified entry ID from the main unit 10 in accordance with the sequence from step S113 to step S121. This procedure is repeated for the number of entry IDs of groups included in the index information. Each time the editing controller 26 specifies one of the entry IDs of groups, the Web API communicator 27 sets the specified entry ID as a request parameter and transmits entry information request data to the request responder 14 of the main unit 10. Specifically, in a case of obtaining group entry information, after information relating to "c1" has been obtained, a request "GET:/ricoh/address/entries/c2" is transmitted from the control panel 20 to the Web server of the main unit 10 in order to obtain information relating to "c2"

(Development Dept.) This process is repeated a plurality of times until all group entry information is obtained.

When obtaining all group entry information corresponding to the entry IDs of groups included in the index information, the editing controller 26 instructs the display controller 25 to display the group selection screen 2100 (see FIG. 15). On the group selection screen 2100 (see FIG. 15), group names and so on in the obtained group entry information are displayed. In this case, each of the selection buttons 2103 on the group selection screen 2100 is a button used to start group editing of the address book and can be regarded as a group edit start button for the address book. Any button that is appropriate for starting group editing of the address book other than the selection buttons 2103 may be called a group edit start button.

Subsequently, when the operator selects a group on the group selection screen 2100 (see FIG. 15), the Web API communicator 27 receives the next instruction information from the editing controller 26 (step S122). This instruction information is instruction information indicating an instruction for obtaining the entry IDs of group members of the selected group. When receiving the instruction information, the Web API communicator 27 adds the entry ID of the selected group to the URI in group information request data (see FIG. 6C) as a request parameter and transmits the group information request data to the request responder 14 of the main unit 10 (step S123). Specifically, the Web API communicator 27 sets an identifier for "group ID" as the key and sets the entry ID of the selected group as the value for the URI in group information request data (see FIG. 6C). For example, when "Administration Dept." is selected by using a corresponding one of the selection buttons 2103 on the group selection screen 2100, a function of "GET:/ricoh/address/groups/c1", which is obtained by adding the entry ID "c1" to the URI, is transmitted from the control panel 20 to the Web server of the main unit 10 as a request in order to obtain group information about the "Administration Dept".

When accepting the group information request data, the request responder 14 of the main unit 10 operates the group information API 15-2 of the Web API server 15 (see FIG. 4) (step S124).

The Web API server 15 (group information API 15-2) specifies "key: group ID" and "value: the entry ID of the selected group (for example, "c1")" added as request parameters as extraction targets and instructs the address book manager 16 to extract group information from the group table T2 (step S125). The address book manager 16 extracts group information about the selected group from the group table T2 (step S126).

The Web API server 15 (group information API 15-2) receives the group information obtained as a result of the extraction process from the address book manager 16 (step S127) and passes the group information to the request responder 14 (step S128).

When receiving the group information from the Web API server 15 (group information API 15-2), the request responder 14 includes the group information in response data and transmits the response data to the Web API communicator 27, which is the request sender (step S129).

When receiving the response data from the request responder 14, the Web API communicator 27 sends to the editing controller 26 a notification that the group information has been obtained (step S130).

When receiving from the Web API communicator 27 the notification that the group information has been obtained, the editing controller 26 specifies one of the entry IDs of individuals included in the group information as an entry ID array and instructs the Web API communicator 27 to obtain entry information corresponding to the entry ID (that is, individual entry information) (step S131). Specifically, in a case where group information about "Administration Dept." has been obtained, the editing controller 26 gives an instruction for obtaining information relating to "a1" and "a2" included in the entry ID array (FIG. 9).

The Web API communicator 27 adds the one entry ID specified by the editing controller 26 to the URI in entry information request data (see FIG. 6B) as a request parameter and transmits the entry information request data to the request responder 14 of the main unit 10 (step S132). Specifically, the Web API communicator 27 sets an identifier for "entry ID" as the key and sets the specified entry ID of an individual (for example, "a1") as the value for the URI in entry information request data (see FIG. 6B). For example, requests, namely, "GET:/ricoh/address/entries/a1" and "GET:/ricoh/address/entries/a2", which are obtained by adding "a1" and "a2" included in the entry ID array of "Administration Dept." to the URI, are transmitted from the control panel 20 to the Web server of the main unit 10. Such a request is repeated for the number of entry IDs in the entry ID array that corresponds to the group ID of the group information.

When accepting the entry information request data, the request responder 14 of the main unit 10 operates the entry information API 15-1 of the Web API server 15 (see FIG. 4) (step S133).

The Web API server 15 (entry information API 15-1) specifies "key: entry ID" and "value: the entry ID of the specified individual (for example, "a1")" added as request parameters as extraction targets and instructs the address book manager 16 to extract entry information (individual entry information) from the entry table T1 (step S134). The address book manager 16 extracts one specified piece of individual entry information (corresponding to, for example, the entry ID "a1") from the entry table T1 in accordance with the instruction (step S135).

The Web API server 15 (entry information API 15-1) receives the one piece of individual entry information obtained as a result of the extraction process from the address book manager 16 (step S136) and passes the individual entry information to the request responder 14 (step S137).

When receiving the individual entry information from the Web API server 15 (entry information API 15-1), the request responder 14 includes the individual entry information in response data and transmits the response data to the Web API communicator 27, which is the request sender (step S138).

When receiving the response data from the request responder 14, the Web API communicator 27 sends to the editing controller 26 a notification that the specified individual entry information has been obtained (step S139).

When receiving from the Web API communicator 27 the notification that the specified individual entry information has been obtained, the editing controller 26 specifies another one of the entry IDs of individuals in the entry ID array described above and obtains one piece of individual entry information corresponding to the specified entry ID from the main unit 10 in accordance with the sequence from step S131 to step S139. This procedure is repeated for the number of entry IDs of individuals included in the entry ID array. Each time the editing controller 26 specifies one of the entry IDs of individuals, the Web API communicator 27 sets the specified entry ID as a request parameter and transmits entry information request data to the request responder 14 of the main unit 10.

When obtaining all individual entry information corresponding to the entry IDs included in the entry ID array, the editing controller 26 instructs the display controller 25 to display the group member check screen 2200 (see FIG. 15). On the group member check screen 2200 (see FIG. 15), the group name in the obtained group information, the individual names of group members of the group in the respective pieces of individual entry information, and so on are displayed.

Subsequently, when the operator performs a touch operation on the address addition button 2203 (see FIG. 15) used to add a member to be included in the group on the group member check screen 2200 (see FIG. 15), which is a check screen for checking members included in the group, the Web API communicator 27 receives instruction information indicating an instruction for obtaining all entry information from the editing controller 26 (step S140). The Web API communicator 27 transmits entry information request data (see FIG. 6B) to the request responder 14 of the main unit 10 (to execute an API) (step S141). Specifically, when a touch operation is performed on the address addition button 2203, a request "GET:/ricoh/address/entries" is transmitted from the control panel 20 to the Web server of the main unit 10 to request all entry information. The address addition button 2203 and the exclusion buttons 2205 on the group member check screen 2200 are examples of buttons for editing operations.

When accepting the entry information request data, the request responder 14 of the main unit 10 operates the entry information API 15-1 of the Web API server 15 (see FIG. 4) (step S142).

The Web API server 15 (entry information API 15-1) instructs the address book manager 16 to extract all entry information from the entry table T1 (step S143). The address book manager 16 extracts all entry information from the entry table T1 in accordance with the instruction (step S144).

The Web API server 15 (entry information API 15-1) receives all entry information obtained as a result of the extraction process from the address book manager 16 (step S145) and passes all the entry information to the request responder 14 (step S146).

When receiving all the entry information from the Web API server 15 (entry information API 15-1), the request responder 14 includes all the entry information in response data and transmits the response data to the Web API communicator 27, which is the request sender (step S147).

When receiving the response data from the request responder 14, the Web API communicator 27 sends to the editing controller 26 a notification that all the entry information has been obtained (step S148).

When receiving from the Web API communicator 27 the notification that all the entry information has been obtained, the editing controller 26 instructs the display controller 25 to display address addition screen information. On the address addition screen 2300 (see FIG. 15), the individual names of individuals other than the existing group members that have been displayed on the group member check screen 2200 (see FIG. 15) are displayed.

Thereafter, when a member to be added is specified on the address addition screen 2300 (see FIG. 15), the editing controller 26 associates the member to be added with the existing group members and instructs the display controller 25 to display the group member check screen 2200 (see FIG. 15) that is refreshed so as to include the member to be added as a group member.

Thereafter, when the operator performs a touch operation on the address addition button 2203 (see FIG. 15), the editing controller 26 instructs the display controller 25 to display individuals other than the group members of the group (including the added member) on the address addition screen 2300 (see FIG. 15) and accepts further addition of a member.

After the editing of information about the group members of the group described above, when the operator performs a touch operation on the register button 2204 (see FIG. 15) on the group member check screen 2200 (see FIG. 15), the Web API communicator 27 receives instruction information indicating an instruction for registering the added member from the editing controller 26 (step S149). The Web API communicator 27 transmits group information registration request (edit/update request) data (see FIG. 6D) to the request responder 14 of the main unit 10 (to execute an API) (step S150).

Specifically, the Web API communicator 27 sets the group ID of the target group and the entry ID array (including the added member) in group information registration request (edit/update request) data (POST) (see FIG. 6D) as request parameters. In a case where there is a member to be excluded, the entry ID of the member to be excluded is deleted from the entry ID array. In a specific operation, when a group member is added or deleted and the register button 2204 is pressed, the group ID and the entry ID array after the editing are added to the URI at once.

For example, in a case of updating the group "Administration Dept." to change the members from the original members a1 and a2 to members a1 and b1, the user excludes a2 (Katoh-san) from the group by pressing a corresponding one of the exclusion buttons 2205, performs an operation for adding b1 (Satoh-san) by using the address addition button 2203, and performs a touch operation on the register button 2204. In response to the touch operation, an HTTPS request is transmitted from the control panel 20 to the Web server of the main unit 10. The request includes a function "POST:/ricoh/address/groups/[Group ID]=c1", and a1 and b1 (entry ID array) described in the JSON format in the body of the request. With this operation, the entry ID array of Administration Dept. in the address book in the main unit 10 is updated so as to include a1 and b1.

When accepting the group information registration request (edit/update request) data, the request responder 14 of the main unit 10 operates the group information registration API 15-3 of the Web API server 15 (see FIG. 4) (step S151).

The Web API server 15 (group information registration API 15-3) specifies the entry ID array corresponding to the group ID set as a request parameter and instructs the address book manager 16 to update the entry ID array in the group table T2 (step S152). The address book manager 16 updates the entry ID array corresponding to the specified group ID in the group table T2 in accordance with the instruction (step S153).

The Web API server 15 (group information registration API 15-3) receives registration result information from the address book manager 16 (step S154) and passes the registration result information to the request responder 14 (step S155).

When receiving the registration result information from the Web API server 15 (group information registration API 15-3), the request responder 14 includes the registration result information in response data and transmits the response data to the Web API communicator 27, which is the request sender (step S156).

When receiving the response data from the request responder 14, the Web API communicator 27 sends to the editing controller 26 a notification that the registration result information has been obtained (step S157).

Regarding the process for editing the address book information in the main unit 10 by the control panel 20 using the APIs of the main unit 10, one example type of process, namely, the "editing process" has been described above. In various types of processes provided by the address book editing application other than this type of process, the control panel 20 uses the APIs of the main unit 10 to obtain part or all of the address book information from the main unit 10 and perform a creation process, a process for deleting an existing group, an attribute information change process, an address check process, and so on.

Creation Process

As another example of the process for editing the address book information in the main unit 10 performed by the control panel 20 using the APIs of the main unit 10, a creation process for grouping pieces of address information is described. Here, a communication process with the main unit 10 is described on the basis of a screen flow of the creation process, and a detailed description of the above-described communication process for communication between the main unit 10 and the control panel 20 is omitted.

Figure 18:
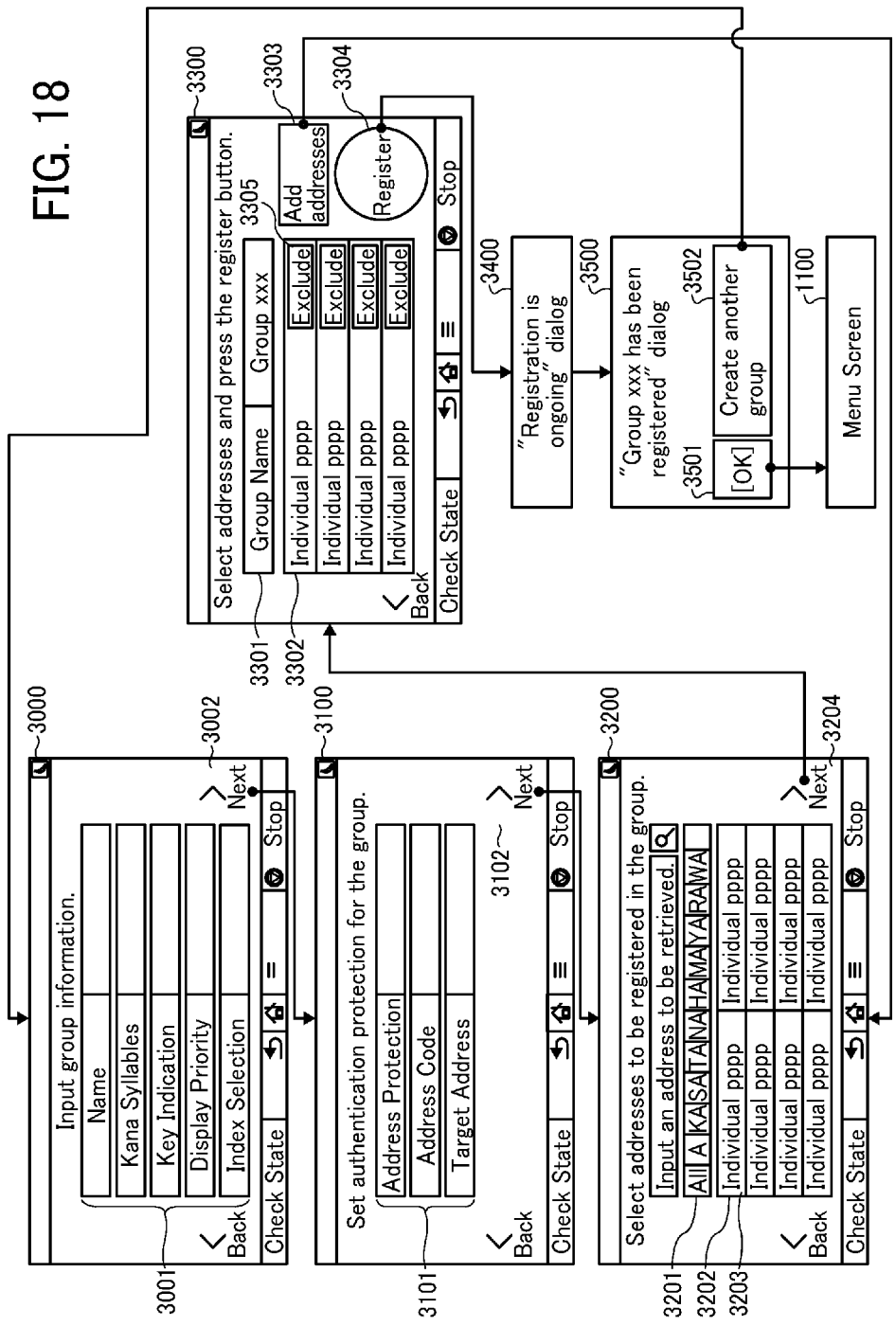
FIG. 18 is a diagram illustrating an exemplary screen flow of a creation process.

FIG. 18 is a diagram illustrating an exemplary screen flow of the creation process. First, the editing controller 26 instructs the display controller 25 to display new group input screen information in response to a touch operation performed on the creation button 1101 (see FIG. 14). Accordingly, the screen transitions from the menu screen 1100 (see FIG. 14) of the address book editing application to a new group input screen 3000.

On the new group input screen 3000, input fields 3001 used to input group attributes including a group name are provided.

Subsequently, when accepting group attribute information and detecting a touch operation performed on a "next" button 3002 on the new group input screen 3000, the editing controller 26 instructs the display controller 25 to display authentication protection setting screen information. Accordingly, the screen transitions to an authentication protection setting screen 3100.

On the authentication protection setting screen 3100, input fields 3101 used to input authentication protection information including address protection, an address code, and a target address are provided.

Subsequently, when accepting authentication protection information and detecting a touch operation performed on a "next" button 3102 on the authentication protection setting screen 3100, the editing controller 26 obtains the index information from the main unit 10 and further obtains the individual entry information from the main unit 10. In order to obtain the information, the Web API communicator 27 uses the APIs of the Web API server 15. The creation button 1101 is a button used to start editing an address book included in the setting information and can be regarded as an edit start button.

The editing controller 26 sets the obtained index information and individual entry information in group member selection screen information and instructs the display controller 25 to display the group member selection screen information. Accordingly, the screen transitions to a group member selection screen 3200.

On the group member selection screen 3200, a plurality of tabs 3201 are provided. In the tabs 3201, the displayed names of indexes that are set are displayed. Each of the tabs 3201 has a tab area 3202 in which selection buttons 3203 for pieces of individual entry information about individuals corresponding to the index of the tab 3201 are arranged.

Subsequently, the editing controller 26 accepts selection and input of a group member of the group performed by using a corresponding one of the selection buttons 3203 for the pieces of entry information about the respective individuals displayed in the tab area 3202 of the tab 3201 selected on the group member selection screen 3200.

When accepting the individual entry ID of the group member and detecting a touch operation performed on a "next" button 3204 on the group member selection screen 3200, the editing controller 26 sets information about the new group accepted on the new group input screen 3000, the authentication protection setting screen 3100, and the group member selection screen 3200 in new group check screen information and instructs the display controller 25 to display a screen of the new group check screen information. Accordingly, the screen transitions to a new group check screen 3300.

On the new group check screen 3300, a group name display area 3301, a group member list display area 3302, an address addition button 3303 used to give an instruction for adding a group member, a register button 3304 used to give an instruction for registering a new group in the main unit 10, and so on are provided. In the group name display area 3301, the displayed name of the group is displayed. In the group member list display area 3302, individual entry information (mainly, the displayed name) of each group member is displayed, and an exclusion button 3305 is arranged for each member.

Subsequently, when detecting a touch operation performed on the address addition button 3303 on the new group check screen 3300, the editing controller 26 instructs the display controller 25 to redisplay the group member selection screen 3200 and accepts selection and input of a member to be added. When a member to be added is selected, the editing controller 26 instructs the display controller 25 to redisplay the new group check screen 3300 so as to include the member to be added.

When detecting a touch operation performed on the register button 3304 on the new group check screen 3300, the editing controller 26 instructs the display controller 25 to display a dialog 3400 indicating that "registration is ongoing" and instructs the Web API communicator 27 to register the new group information in the main unit 10. In the registration of the new group information, the Web API communicator 27 uses the APIs of the Web API server 15. Specifically, the Web API communicator 27 passes the new group information to the request responder 14 of the main unit 10 and requests registration using the APIs. When registration by the main unit 10 is completed, the Web API communicator 27 receives a notification of completion of registration from the request responder 14 of the main unit 10.

When registration is completed, the editing controller 26 instructs the display controller 25 to switch the display to a dialog 3500 indicating "completion of registration".

When detecting a touch operation performed on an "OK" button 3501 on the dialog 3500 indicating "completion of registration", the editing controller 26 instructs the display controller 25 to stop displaying the dialog 3500 and to display menu screen information. Accordingly, the screen transitions to the menu screen 1100. When detecting a touch operation performed on a "create another group" button 3502 on the dialog 3500 indicating "completion of registration", the editing controller 26 instructs the display controller 25 to stop displaying the dialog 3500 and to display new group input screen information. Accordingly, the screen transitions to the new group input screen 3000.

Second Embodiment

Now, a case where the main unit 10 enters an energy saving mode while the control panel 20 is editing the setting information is assumed, and a configuration for returning from the energy saving mode is described. The energy saving mode refers to a sleep mode or a suspend mode in which power supply to part of the main unit 10 is temporarily stopped. A configuration different from that of the first embodiment is described below. Further, common components are, for example, assigned a common reference numeral in the figures and a description thereof is omitted.

Figure 19:
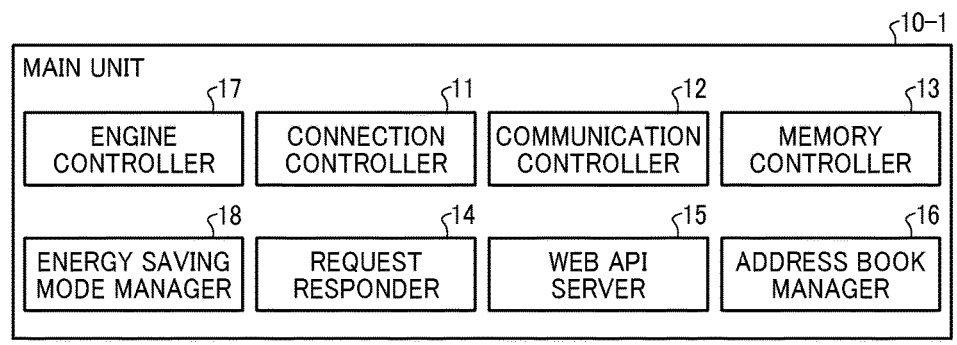
FIG. 19 is a diagram illustrating exemplary functions provided by a main unit of an MFP according to a second embodiment.

FIG. 19 is a diagram illustrating exemplary functions provided by a main unit of an MFP according to a second embodiment. Here, functions relating to obtaining and editing (registering) of address book information are illustrated as in the first embodiment. The functions of a control panel of the MFP according to the second embodiment are the same as the functions of the control panel 20 (see FIG. 3) described in the first embodiment, and therefore, are not illustrated.

FIG. 19 illustrates a main unit 10-1, which is based on the main unit 10 (see FIG. 3) according to the first embodiment and further includes an energy saving mode manager 18. The energy saving mode manager 18 is an example of an energy saving mode switch. The energy saving mode manager 18 is included in the first OS and performs management for entering and returning from the energy saving mode. Specifically, the energy saving mode manager 18 measures the time from the time point at which input from the control panel 20 is not accepted any more. When the measured time reaches a transition time for the energy saving mode, the energy saving mode manager 18 saves work data of the address book manager 16, the engine controller 17, and so on and stops supplying power to predetermined hardware. The energy saving mode manager 18 monitors a restoration signal in the energy saving mode. When detecting a restoration signal, the energy saving mode manager 18, for example, restarts power supply to the hardware that is in a suspend state and restores the mode from the energy saving mode to the original mode.

After the restart of power supply to the hardware, the Web API server 15 of the main unit 10-1 activates the editing controller (address book editing application) 26 (see FIG. 3), and thereafter, checks connection between the control panel 20 and the main unit 10-1 via the Web API communicator 27 (see FIG. 3). The Web API server 15 receives a restoration request to the main unit 10-1 from the control panel 20 and activates (restores) the functions of the main unit 10-1, namely, the address book manager 16, the engine controller 17, and so on. The address book manager 16 may, in response to a request from the Web API server 15, activate (restore) the functions of the main unit 10-1, namely, the address book manager 16, the engine controller 17, and so on.

Figure 20:
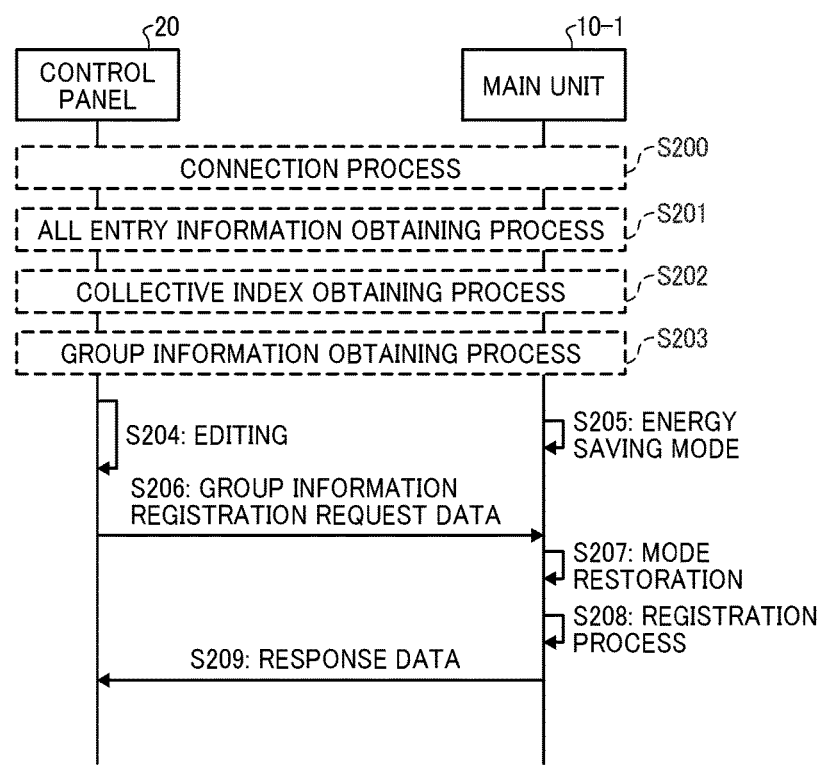
FIG. 20 is a diagram illustrating an exemplary process for mode restoration from an energy saving mode of the main unit by the control panel.

FIG. 20 is a diagram illustrating an exemplary process for mode restoration from the energy saving mode of the main unit 10-1 by the control panel 20. In this example, in order to illustrate an appropriate example in which the main unit 10-1 enters the energy saving mode, an example obtained by modifying the number of times the control panel 20 uses the APIs of the main unit 10 and by modifying the procedure in the example described in the first embodiment (see FIG. 16 and FIG. 17) is illustrated. The screen transitions on the control panel 20 are exactly the same as the exemplary transitions described in the first embodiment.

In the procedure illustrated in FIG. 20, the control panel 20 first performs a connection process with the main unit 10-1 (step S200). This connection process corresponds to the exemplary communication process from step S100 to step S103 (see FIG. 16) performed between the control panel 20 and the main unit 10 described in the first embodiment.

Subsequently, the control panel 20 performs an all-entry-information obtaining process with the main unit 10-1 (step S201). This all-entry-information obtaining process corresponds to the communication process from step S140 to step S148 (see FIG. 17).

Subsequently, the control panel 20 performs a collective index obtaining process with the main unit 10-1 (step S202). This collective index obtaining process corresponds to the communication process from step S104 to step S112 (see FIG. 16).

Subsequently, the control panel 20 performs a group information obtaining process with the main unit 10-1 (step S203). This group information obtaining process corresponds to the communication process from step S122 to step S130 (see FIG. 16).

As described above, in the exemplary procedure in the second embodiment, the control panel 20 performs a connection check with the main unit 10-1, and thereafter, successively obtains all entry information, index information, and group information used in group editing.

Subsequently, the control panel 20 performs an editing process by using the information obtained in the processes from step S201 to step S203 (step S204). The control panel 20 temporarily saves the obtained information in a predetermined area of the RAM 202, performs control to display information that corresponds to the screen, and allows the operator to change group members of a group.

An operation of making changes to a group on the control panel 20 involves selection of a plurality of items on a plurality of screens, and therefore, takes time. When input on the control panel 20 stops for a while and the energy saving mode manager 18 of the main unit 10-1 detects the expiration of the transition time for the energy saving mode, the mode transitions to the energy saving mode (step S205).

When the operator ends an editing operation and performs a touch operation on the register button 2204 on the group member check screen 2200 (see FIG. 15), the control panel 20 transmits group information registration request data including group edit information to the main unit 10-1 (step S206).

The energy saving mode manager 18 of the main unit 10-1 detects a signal of the group information registration request data (restoration signal) and restores the mode from the energy saving mode to the original mode (step S207).

The main unit 10-1 further performs a registration process for address book information (in a case of an update, an update process) on the basis of the group information registration request data (step S208).

The main unit 10-1 includes the result of the registration process in response data and transmits the response data to the control panel 20 (step S209).

Here, the group information registration request data is used as an example of the restoration signal. Examples of the restoration signal include other request data.

Third Embodiment

In the first embodiment, the form used in the case where the control panel 20 uses the APIs of the main unit 10 has been described. However, in addition to the control panel 20, a general-purpose computer, such as a personal computer (PC) or a smartphone, which is an apparatus external to the MFP, may use the APIs of the main unit 10. Here, a form used in the case where an external apparatus, such as a PC or a smartphone, other than the control panel 20 uses the APIs of the main unit 10 is described.

Figure 21:
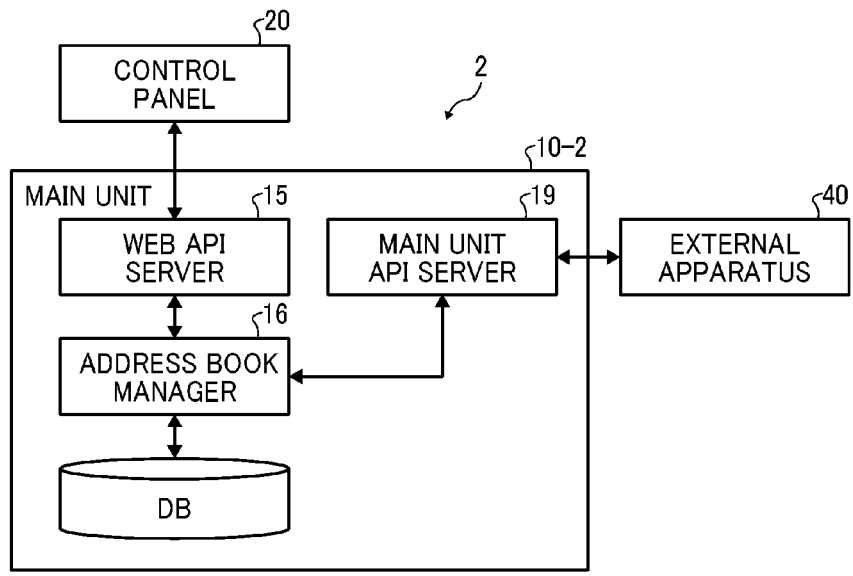
FIG. 21 is a diagram illustrating an exemplary overall configuration of an information processing system according to a third embodiment.

FIG. 21 is a diagram illustrating an exemplary overall configuration of an information processing system according to a third embodiment. The information processing system illustrated in FIG. 21 includes an MFP 2 that includes the control panel 20 and a main unit 10-2, and an external apparatus (a PC or a smartphone) 40 that communicates with the main unit 10-2 over a network.

The main unit 10-2 illustrated in FIG. 21 has a functional block configuration different from that in the first embodiment. As illustrated in FIG. 21, the main unit 10-2 is based on the main unit 10 (see FIG. 3) and further includes a main-unit API server 19. The main-unit API server 19 mainly corresponds to a second Web API service. In FIG. 21, some functions, namely, the connection controller 11, the communication controller 12, the memory controller 13, the request responder 14, and so on, are not illustrated for easy understanding. For example, the external apparatus 40 accesses the main-unit API server 19 via the communication controller 12.

The main-unit API server 19 makes Simple Object Access Protocol (SOAP) Web APIs available to the external apparatus 40. The SOAP Web APIs are used to manage sessions and to accept an edit instruction for address book information from the external apparatus 40. Address book information registered by the address book manager 16 using the SOAP Web APIs is shared between the control panel 20 and the external apparatus 40. The SOAP Web APIs use data in the XML format for both requests and responses.

The Web API server 15 (first Web API service) communicates with the control panel 20 via the REST Web APIs. The main-unit API server 19 (second Web API service) communicates with the external apparatus 40 via the SOAP Web APIs. Accordingly, the method used may differ, and the REST method or the SOAP method may be used depending on the Web API service. Alternatively, the first and second Web API services may use the same method, that is, both the first and second Web API services may use the REST method or the SOAP method.

Figure 22:
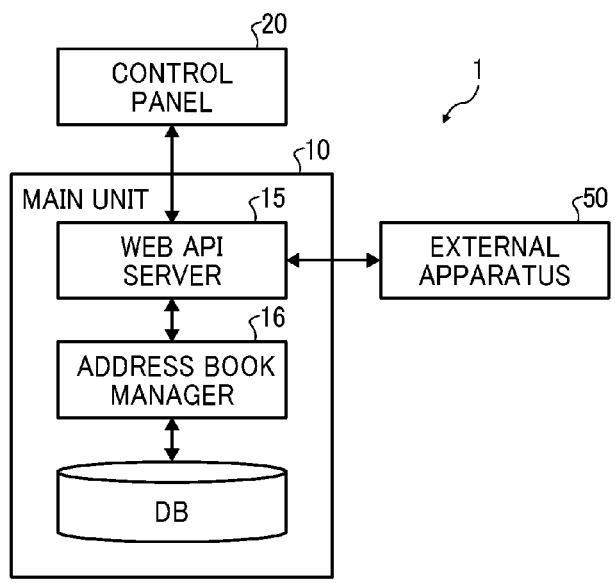
FIG. 22 is a diagram illustrating another exemplary overall configuration of the information processing system according to the third embodiment.

FIG. 22 is a diagram illustrating another exemplary overall configuration of the information processing system according to the third embodiment. The information processing system illustrated in FIG. 22 includes the MFP 1, which includes the control panel 20 and the main unit 10, and an external apparatus (for example, a PC or a smartphone) 50 that communicates with the main unit 10 over a network. The external apparatus 50 includes an address book information editing application and so on. Here, the Web API server 15 (first Web API service) communicates with a plurality of apparatuses including the control panel 20 and the external apparatus 50 via the REST Web APIs. The Web API server 15 (first Web API service) may perform communication via the SOAP Web APIs.

As described above, the Web API server 15 may be made available not only to the control panel 20 but also to the external apparatus 50.

Communication between the external apparatus 50 and the main unit 10 need not be communication over a network and may be short-range wireless communication, such as Bluetooth (registered trademark).

As described above, according to the embodiments, the control panel or the external apparatus can operate setting information in the main unit of the image processing apparatus. Therefore, the control panel or the external apparatus can obtain and edit setting information in the main unit of the image processing apparatus.

The image processing apparatus and the information processing system according to the embodiments execute a program that is recorded to a computer-readable recording medium, such as a compact disc read-only memory (CD-ROM), a flexible disc (FD), a compact disc recordable (CD-R), or a digital versatile disk (DVD), as an installable or executable file and provided.

The program executed by the image processing apparatus and the information processing system according to the embodiments may be stored on a computer that is connected to a network, such as the Internet, downloaded over the network, and provided. The program executed by the image processing apparatus and the information processing system according to the embodiments may be provided or distributed over a network, such as the Internet.

Alternatively, the program according to the embodiments may be built in advance into, for example, a ROM and provided.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image processing apparatus comprising:
an image processing engine to perform image processing;
a memory to store setting information used in the image processing;
a control panel to accept an operation instruction for operating the image processing engine and an input instruction for editing the setting information; and
a Web server, functioning as a Web Application Programming Interface (API) service, to accept a request of the instruction for editing the setting information from the control panel via one or more Web APIs,
wherein the control panel is configured to receive a response to the request of the instruction for editing from the Web API service, and display the received response as a result of the editing of the setting information,
wherein the control panel is further configured to:
in response to selection of an edit start button on the control panel, send a request for the setting information as a target of editing to the Web API service to obtain the setting information by using an API for requesting the setting information;

display a screen including the obtained setting information in a list format;

in response to a selection of a button for editing the setting information on the screen, edit the obtained setting information;

in response to a selection of a button for registering the edited setting information after the editing, send a request for registration of the edited setting information to the Web API service by using an API for registering the setting information;

receive a response to the request for registration of the edited setting information from the Web API service; and display a result of the editing based on the response.

2. The image processing apparatus according to claim 1, wherein the control panel includes a creation button configured to group pieces of address information, wherein the setting information is address book information that includes a plurality of items of address information each indicating a transmission destination of image data obtained by image processing, and group information indicating a group of one or more items of the address information, and the instruction for editing includes at least one of: an instruction to group one or more items of address information into a group; an instruction to add one or more items of address information to a group; and an instruction to delete one or more items of address information from a group.

3. The image processing apparatus according to claim 2, wherein the control panel is configured to:

in response to an instruction to edit address information, send a request for group information to the Web API service to obtain the group information by using a group information API for obtaining group information;

display a screen including one or more groups in a list format using the obtained group information;

in response to selection of a group from the groups displayed on the screen, obtain one or more items of address information belonging to the selected group by using an address information API for obtaining address information;

display a screen including the obtained one or more items of address information in a list format;

in response to selection of a button for editing address information on the screen, perform an editing process to add or delete one or more items of address information to or from the selected group; and in response to selection of a register button after the editing process, register the selected group having the edited address information, by using a registration API.

4. The image processing apparatus according to claim 3, wherein, when the button for editing is a button for adding address information not included in the list, the control panel obtains all items of address information stored in the memory by using the address information API and selects the one or more items of address information to be added to the selected group, and wherein, when the button for editing is a button for deleting address information, the control panel deletes the one or more items of address information from the selected group.

5. The image processing apparatus according to claim 2, wherein the memory stores a first information table including the address information, and a second information table including the group information, and the one or more Web APIs include a first API configured to accept obtaining of the address information included in the first information table, a second API configured to accept obtaining of the group information included in the second information table, and a third API configured to accept editing of the group information included in the second information table.

6. The image processing apparatus according to claim 5, wherein the memory further stores a third information table including index information about the address information, and the one or more Web APIs further include a fourth API configured to accept obtaining of the index information included in the third information table.

7. The image processing apparatus according to claim 2, wherein the one or more Web APIs include a SOAP Web API configured to accept obtaining or editing of the address book information by an external apparatus, and the Web API service is configured to in response to accepting the obtaining or the editing of the address book information by the external apparatus via the SOAP Web API, use a result of processing previously performed, and output a result of processing that corresponds to the SOAP Web API to the external apparatus as an end result of the editing.

8. The image processing apparatus according to claim 1, wherein the Web API service is configured to receive a request for editing the setting information used in the image processing from both the control panel and an external apparatus using a REST Web API.

9. The image processing apparatus according to claim 1, further comprising:

a first Web API service configured to receive a request for editing the setting information used in the image processing from the control panel via a REST Web API; and a second Web API service configured to receive a request for editing the setting information used in the image processing from an external apparatus via a SOAP Web API.

10. The image processing apparatus according to claim 1, wherein the Web API service is configured to accept the request of the instruction for the editing via a Web API of a corresponding operation type among the one or more Web APIs, and the control panel is configured to receive a result of processing that corresponds to the Web API of the corresponding operation type from the Web API service, and display the received result as an end result of the editing of the setting information.

11. The image processing apparatus according to claim 1, further comprising an energy saving mode switch configured to control the image processing apparatus to make a transition from an energy saving mode to a normal operation mode, in response to detection of a restoration signal from the control panel.

12. The image processing apparatus according to claim 1, further comprising a main unit including the image processing engine, a first OS, a first CPU, and the Web server, wherein the control panel includes a second OS, a second CPU, and an address book editing application that sends a request for editing an address book to the Web API service of the main unit via an API, the address book editing application being executed by the second CPU on the second OS.

13. The image processing apparatus according to claim 1, wherein the control panel is configured to send a request for editing the setting information to the Web API service by using a REST Web API of the Web API service, the request including a method and a URI.

14. An information processing system comprising:
an image processing apparatus including:
  an image processing engine to perform image processing;
  a memory to store setting information used in the image processing; and
  a Web server; and
an information processing apparatus communicable with the image processing apparatus, the apparatus including:
  a user interface to accept an operation instruction for operating the image processing engine and an input instruction for editing the setting information,
wherein the Web server, functioning as a Web Application Programming Interface (API) service, accepts a request of the instruction for editing the setting information from the user interface via one or more Web APIs, and
wherein the user interface is configured to receive a response to the request of the instruction for editing from the Web API service, and display the received response as a result of the editing of the setting information,
wherein the user interface is further configured to:
in response to selection of an edit start button on the user interface, send a request for the setting information as a target of editing to the Web API service to obtain the setting information by using an API for requesting the setting information;
display a screen including the obtained setting information in a list format;
in response to a selection of a button for editing the setting information on the screen, edit the obtained setting information;
in response to a selection of a button for registering the edited setting information after the editing, send a request for registration of the edited setting information to the Web API service by using an API for registering the setting information;
receive a response to the request for registration of the edited setting information from the Web API service; and
display a result of the editing based on the response.

15. The information processing system according to claim 14,
wherein the user interface of the information processing apparatus is a control panel, provided for the image processing apparatus.

16. An information processing method comprising:
storing setting information on an image processing apparatus, the image processing apparatus including an image processing engine;
receiving, at a control panel, an operation instruction for operating the image processing engine and an input instruction for editing the setting information;
accepting, by a Web Application Programming Interface (API) service of the image processing apparatus, a request of the instruction for editing the setting information from the control panel via one or more Web APIs;
receiving, by the control panel, a response to the request of the instruction for editing from the Web API service;
displaying, by the control panel, the received response as a result of the editing of the setting information,
wherein in response to selecting an edit start button on the control panel, sending a request for the setting information as a target of editing to the Web API service to obtain the setting information by using an API for requesting the setting information;
displaying a screen including the obtained setting information in a list format;
editing the obtained setting information;
sending a request for registration of the edited setting information to the Web API service by using an API for registering the setting information; and
displaying a result of the editing based on the response.

* * * * *